(12) United States Patent
Takesue et al.

(10) Patent No.: US 11,554,591 B2
(45) Date of Patent: Jan. 17, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Naoya Takesue, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 17/202,777

(22) Filed: Mar. 16, 2021

(65) Prior Publication Data
US 2021/0303950 A1 Sep. 30, 2021

(30) Foreign Application Priority Data
Mar. 31, 2020 (JP) .............................. JP2020-063628

(51) Int. Cl.
| | |
|---|---|
| *B41J 29/393* | (2006.01) |
| *B41J 2/21* | (2006.01) |
| *G06K 15/00* | (2006.01) |
| *B41J 2/045* | (2006.01) |
| *G06K 15/10* | (2006.01) |
| *G06K 15/02* | (2006.01) |
| *B41J 2/165* | (2006.01) |
| *B41J 2/205* | (2006.01) |

(52) U.S. Cl.
CPC ........... *B41J 2/2142* (2013.01); *B41J 2/0451* (2013.01); *B41J 2/04558* (2013.01); *B41J 2/04586* (2013.01); *B41J 2/16579* (2013.01); *B41J 2/2139* (2013.01); *B41J 29/393* (2013.01); *G06K 15/027* (2013.01); *G06K 15/102* (2013.01); *G06K 15/407* (2013.01); *B41J 2/205* (2013.01); *B41J 2029/3935* (2013.01)

(58) Field of Classification Search
CPC .. B41J 29/393; B41J 2029/3935; B41J 2/2132; B41J 2/2139; B41J 2/2142
See application file for complete search history.

(56) References Cited

U.S. PATENT DOCUMENTS

| | | | |
|---|---|---|---|
| 9,201,839 B2 | 12/2015 | Hara et al. | |
| 9,462,091 B2 | 10/2016 | Hara et al. | |
| (Continued) | | | |

FOREIGN PATENT DOCUMENTS

| | | |
|---|---|---|
| JP | 2012-71474 A | 4/2012 |
| JP | 2012-147126 A | 8/2012 |

*Primary Examiner* — Julian D Huffman
(74) *Attorney, Agent, or Firm* — Carter, DeLuca & Farrell LLP

(57) ABSTRACT

An object is to enable highly accurate density unevenness correction while suppressing a reduction in productivity of printing accompanying correction value calculation for density unevenness correction. In the image processing apparatus, density correction information that specifies an output tone value for implementing a target density for an input tone value for each nozzle and which does not include the influence by a non-ejectable nozzle that cannot eject ink normally is acquired. In a case where a non-ejectable nozzle is detected during printing processing, output tone values corresponding to the detected non-ejectable nozzle and peripheral nozzles thereof among output tone values specified in the density correction information are changed.

4 Claims, 24 Drawing Sheets

(56) References Cited

U.S. PATENT DOCUMENTS

| | | |
|---|---|---|
| 9,485,388 B2 | 11/2016 | Kodama et al. |
| 9,734,439 B2 | 8/2017 | Hara et al. |
| 9,749,496 B2 | 8/2017 | Fujimoto et al. |
| 10,027,848 B2 | 7/2018 | Fuse et al. |
| 10,043,118 B2 | 8/2018 | Sumi et al. |
| 10,057,459 B2 | 8/2018 | Yamamoto et al. |
| 10,063,743 B2 | 8/2018 | Fuse et al. |
| 10,073,370 B2 | 9/2018 | Takikawa et al. |
| 10,187,553 B2 | 1/2019 | Takesue et al. |
| 10,194,053 B2 | 1/2019 | Otani et al. |
| 10,205,854 B2 | 2/2019 | Shimada et al. |
| 10,356,282 B2 | 7/2019 | Ochiai et al. |
| 10,545,446 B2 | 1/2020 | Takikawa et al. |
| 10,733,488 B2 | 8/2020 | Takesue et al. |
| 10,831,121 B2 | 11/2020 | Yanai et al. |
| 10,834,288 B2 | 11/2020 | Hashioka et al. |
| 10,855,877 B2 | 12/2020 | Takesue et al. |
| 10,896,358 B2 | 1/2021 | Kikuta et al. |
| 2012/0050377 A1* | 3/2012 | Ueshima ............... B41J 2/2142 347/19 |
| 2020/0079102 A1 | 3/2020 | Ochiai et al. |
| 2020/0156386 A1 | 5/2020 | Otani et al. |
| 2020/0184289 A1 | 6/2020 | Takesue et al. |
| 2020/0198365 A1 | 6/2020 | Ochiai et al. |
| 2020/0247137 A1 | 8/2020 | Otani et al. |
| 2020/0349405 A1 | 11/2020 | Otani et al. |
| 2021/0001638 A1* | 1/2021 | Shibata ............... B41J 2/04508 |
| 2021/0158112 A1 | 5/2021 | Otani et al. |

* cited by examiner

|  | NOZZLE POSITION NUMBER | | | | | | |
|---|---|---|---|---|---|---|---|
| | 0 | 1 | ... | n-1 | n | n+1 | ... |
| 0 | 0 | 0 | ... | 0 | 0 | 0 | ... |
| 32 | 31 | 34 | ... | 30 | 32 | 33 | ... |
| 64 | 63 | 70 | ... | 62 | 64 | 65 | ... |
| . | . | . | | . | . | . | |
| . | . | . | ... | . | . | . | ... |
| . | . | . | | . | . | . | |
| 255 | 255 | 255 | ... | 255 | 255 | 255 | ... |

(TONE VALUE on vertical axis)

FIG.11A

|  | NOZZLE POSITION NUMBER | | | | | | |
|---|---|---|---|---|---|---|---|
| | 0 | 1 | ... | n-1 | n | n+1 | ... |
| 0 | 0 | 0 | ... | 0 | 0 | 0 | ... |
| 32 | 31 | 34 | ... | 46 | 0 | 55 | ... |
| 64 | 63 | 70 | ... | 94 | 0 | 97 | ... |
| . | . | . | | . | . | . | |
| . | . | . | ... | . | . | . | ... |
| . | . | . | | . | . | . | |
| 255 | 255 | 255 | ... | 255 | 0 | 255 | ... |

(TONE VALUE on vertical axis)

FIG.11B

FIG.18
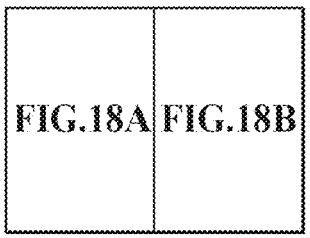
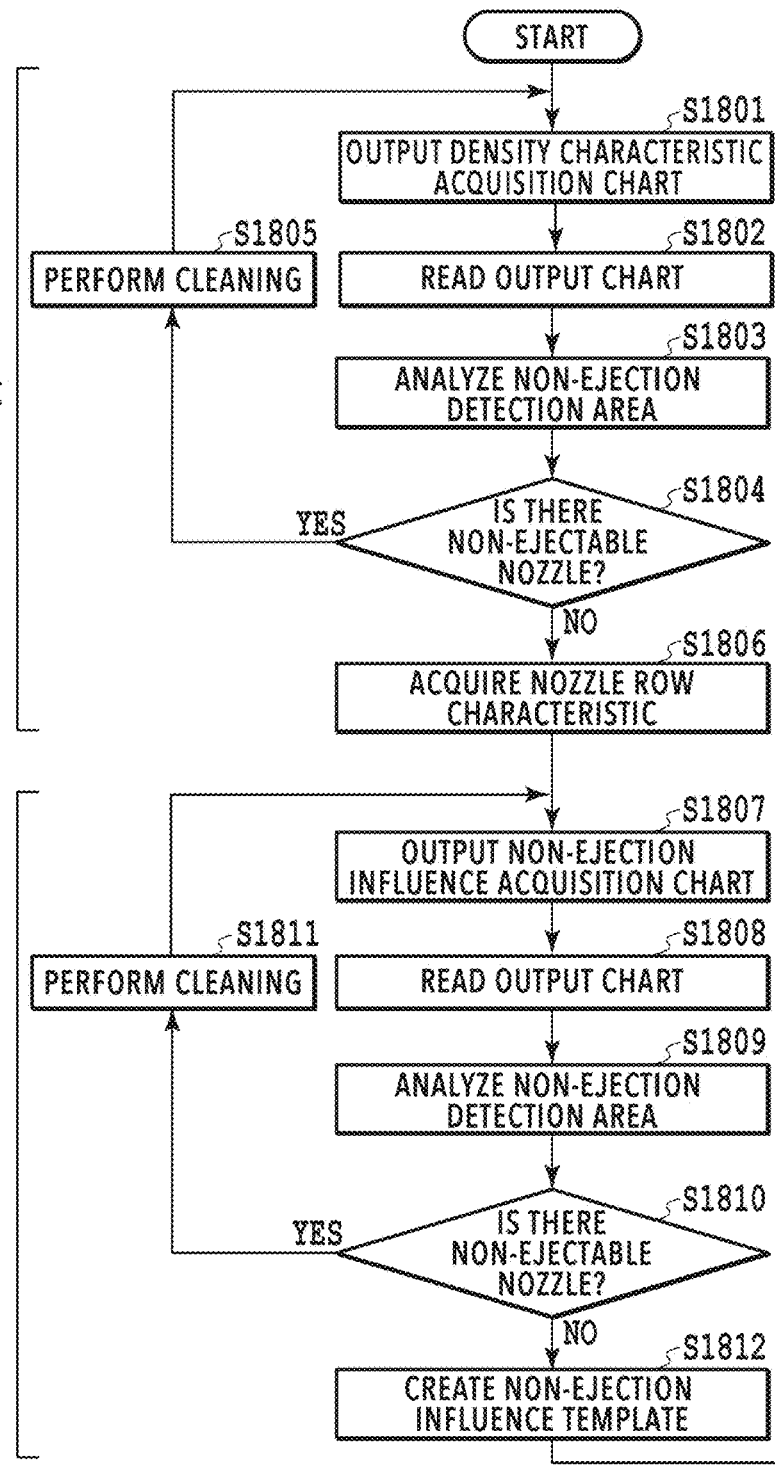

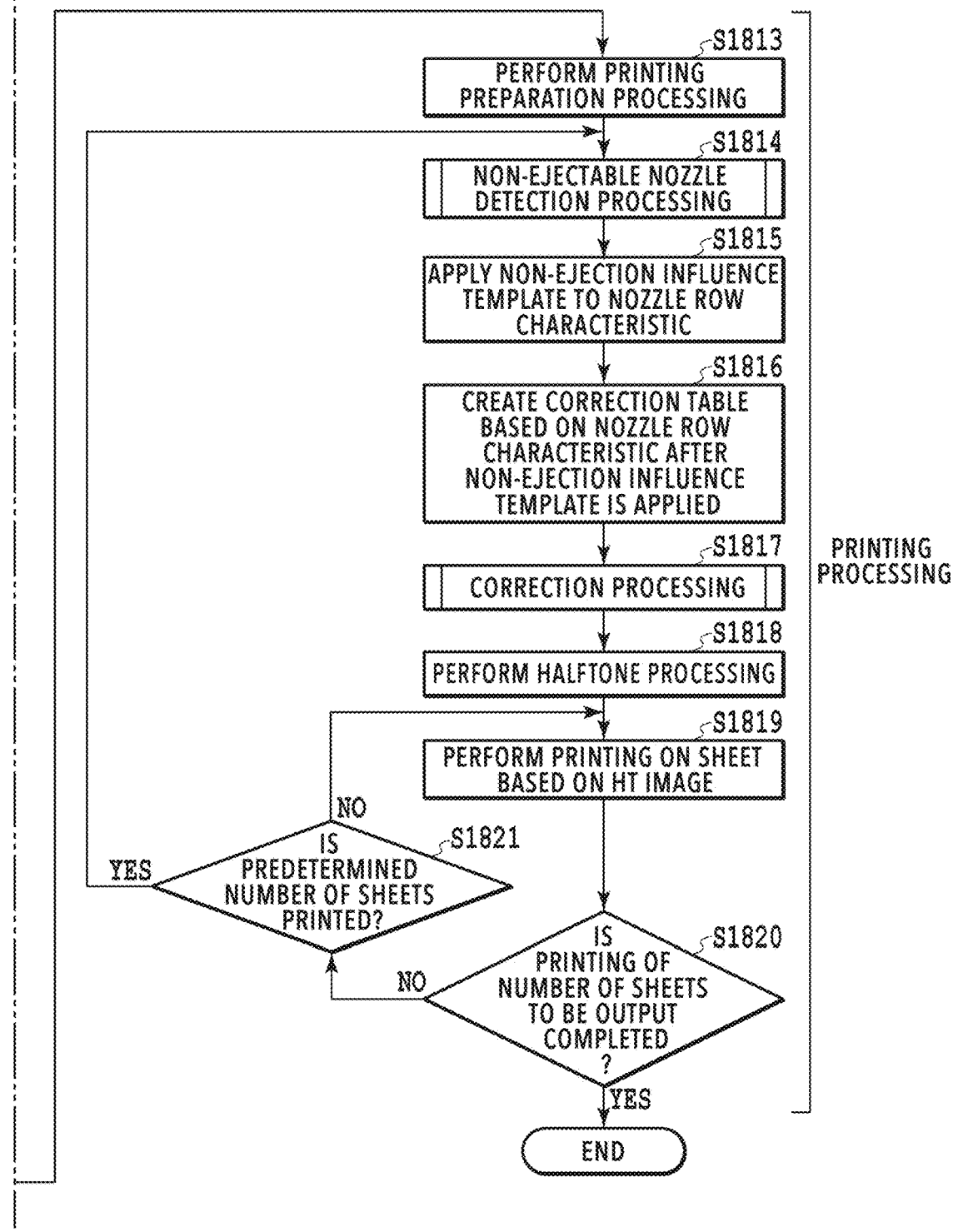

| TONE VALUE | RELATIVE NOZZLE POSITION | | | | | | |
| --- | --- | --- | --- | --- | --- | --- | --- |
| | -3 | -2 | -1 | 0 | +1 | +2 | +3 |
| 0 | 0.000 | 0.000 | 0.000 | 0.000 | 0.000 | 0.000 | 0.000 |
| 32 | 0.000 | -0.008 | -0.049 | -0.112 | -0.044 | -0.004 | 0.000 |
| 64 | -0.001 | -0.024 | -0.148 | -0.321 | -0.131 | -0.011 | 0.000 |
| ⋮ | ⋮ | ⋮ | ⋮ | ⋮ | ⋮ | ⋮ | ⋮ |
| 255 | -0.005 | -0.119 | -0.741 | -1.503 | -0.655 | -0.056 | -0.001 |

FIG.19

|  | \multicolumn{6}{c}{NOZZLE POSITION NUMBER} |
| --- | --- | --- | --- | --- | --- | --- |
| TONE VALUE | 0 | 1 | ... | 96 | 97 | 98 | ... |
| 0 | 0.000 | 0.000 | ... | 0.000 | 0.000 | 0.000 | ... |
| 32 | 0.285 | 0.272 | ... | 0.241 | 0.228 | 0.269 | ... |
| 64 | 0.526 | 0.481 | ... | 0.441 | 0.472 | 0.552 | ... |
| ⋮ | ⋮ | ⋮ | ... | ⋮ | ⋮ | ⋮ | ... |
| 255 | 2.114 | 1.864 | ... | 1.757 | 1.794 | 2.101 | ... |

FIG.20A

|  | NOZZLE POSITION NUMBER |
| --- | --- |

| TONE VALUE | 0 | 1 | ... | 96 | 97 | 98 | ... |
| --- | --- | --- | --- | --- | --- | --- | --- |
| 0 | 0.000 | 0.000 | ... | 0.000 | 0.000 | 0.000 | ... |
| 32 | 0.285 | 0.272 | ... | 0.192 | 0.116 | 0.225 | ... |
| 64 | 0.526 | 0.481 | ... | 0.293 | 0.151 | 0.421 | ... |
| ⋮ | ⋮ | ⋮ | ... | ⋮ | ⋮ | ⋮ | ... |
| 255 | 2.114 | 1.864 | ... | 1.016 | 0.291 | 1.446 | ... |

FIG.20B

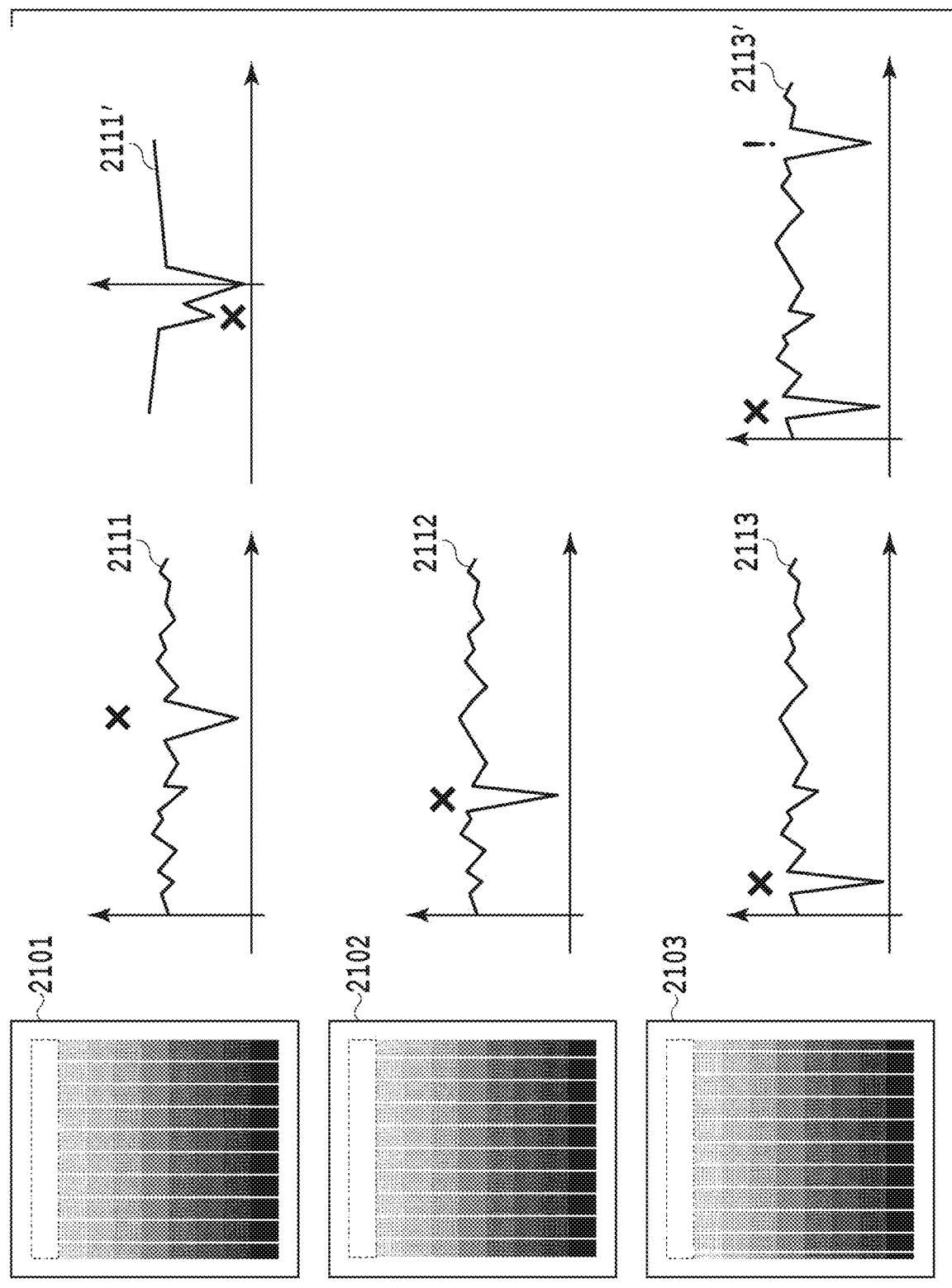

IMAGE PROCESSING APPARATUS, IMAGE PROCESSING METHOD, AND STORAGE MEDIUM

BACKGROUND OF THE INVENTION

Field of the Invention

The present disclosure relates to an image processing technique for reducing density unevenness and streaks that occur at the time of forming an image by ejecting ink.

Description of the Related Art

Conventionally, an ink jet printing apparatus is used that forms a desired image on a printing medium by ejecting ink droplets from each nozzle while relatively moving a print head having a nozzle row in which a plurality of ink ejection ports (nozzles) is arrayed and the printing medium. There is a case where the ink head that is used in the ink jet printing apparatus has a variation in the ejection amount among a plurality of nozzles due to manufacturing errors and the like. In a case where the variation in the ejection amount such as this exists, it may happen sometimes that density unevenness occurs in an image that is formed.

Conventionally, as processing to reduce the density unevenness such as this, the HS (Head Shading) technique is known. In the HS technique, the density unevenness that occurs in a formed image is reduced by increasing or reducing the number or the size of ink dots that are finally formed in accordance with information (nozzle characteristic) relating to the ejection amount of each nozzle. At the time of acquiring the above-described nozzle characteristic, for example, a method is used generally in which a chart including patches of uniform density for each tone is printed on a paper surface and the printing results are read by a scanner and the read image is analyzed.

On the other hand, there is a case where a non-ejectable nozzle that cannot eject ink droplets occurs among a plurality of nozzles within the print head. As a technique to suppress white streaks on an image, which result from the non-ejectable nozzle such as this, non-ejection complementation processing is known. In the non-ejection complementation processing, white streaks are suppressed by forming ink droplets that should be formed by the non-ejectable nozzle by another nozzle in a complementary manner. Japanese Patent Laid-Open 2012-71474 has described a technique to complement ink droplets in the charge of the non-ejectable nozzle by peripheral nozzles thereof based on the acquired nozzle characteristic.

The density unevenness correction processing and the non-ejection complementation processing, both described above, are processing independent of each other, but it is known that as a result of both pieces of processing being performed in the area corresponding to the non-ejectable nozzle and the peripheral nozzles thereof in an overlapping manner, the correction in the area becomes excessive and a black streak and density unevenness occur. In this regard, Japanese Patent Laid-Open No. 2012-147126 has described a technique to suppress black streaks and density unevenness by modifying the read data of the density distribution measurement chart based on the information on the non-ejectable nozzle and calculating the correction value for the density unevenness correction based on the modified read data.

There is a case where a non-ejectable nozzle recovers and becomes a normal nozzle by performing cleaning processing of the print head in the maintenance mode or the like. On the other hand, there is a case where a non-ejectable nozzle occurs suddenly during execution of printing processing. Because of this, in a case where an attempt is made to maintain favorable printing results by the method of Japanese Patent Laid-Open No. 2012-147126 described above, it is necessary to frequently perform correction value calculation for the density unevenness correction that takes the non-ejectable nozzle into consideration. However, the above-described correction value calculation requires much time and effort, and therefore, in a case where this is performed frequently, productivity of printing is reduced.

Consequently, an object of the technique of the present disclosure is to enable highly accurate density unevenness correction while suppressing a reduction in productivity of printing accompanying correction value calculation for density unevenness correction.

SUMMARY OF THE INVENTION

The image processing apparatus according to the present disclosure is an image processing apparatus for performing printing on a printing medium by using a print head including a plurality of nozzles ejecting ink, and includes: a detection unit configured to detect a non-ejectable nozzle that cannot eject ink normally among the plurality of nozzles; an acquisition unit configured to acquire density correction information that specifies an output tone value for implementing a target density for an input tone value for each nozzle and which does not include influence by the non-ejectable nozzle; and a changing unit configured to change output tone values corresponding to the detected non-ejectable nozzle and peripheral nozzles thereof among output tone values specified in the density correction information based on results of detection by the detection unit.

Further features of the present invention will become apparent from the following description of exemplary embodiments with reference to the attached drawings.

BRIEF DESCRIPTION OF THE DRAWINGS

FIG. 11A and FIG. 11B are diagrams explaining a change of a correction table;

FIG. 18 is a diagram showing a relationship between FIGS. 18A and 18B, and FIGS. 18A and 18B are flowcharts showing a flow of general processing in an image forming system according to the third embodiment;

FIG. 19 is a diagram showing an example of a non-ejection influence template:

FIG. 20A is a diagram showing a nozzle row characteristic before applying a non-ejection influence template and FIG. 20B is a diagram showing an example of the nozzle row characteristic after applying the non-ejection influence template:

FIG. 21 is a diagram explaining a fourth embodiment;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, a correction table not including the influence of a non-ejectable nozzle is obtained by repeating cleaning processing of a print head and outputting of a predetermined chart to which a pattern capable of detecting a non-ejectable nozzle is attached until a non-ejectable nozzle is no longer detected by using the predetermined chart. Then, the occurrence of white streak due to a non-ejectable nozzle is suppressed by performing non-ejectable nozzle detection processing at predetermined timing in a case of performing printing processing and appropriately modifying the correction table in a case where a non-ejectable nozzle is detected.

<Hardware Configuration of Image Forming System>

Figure 1:
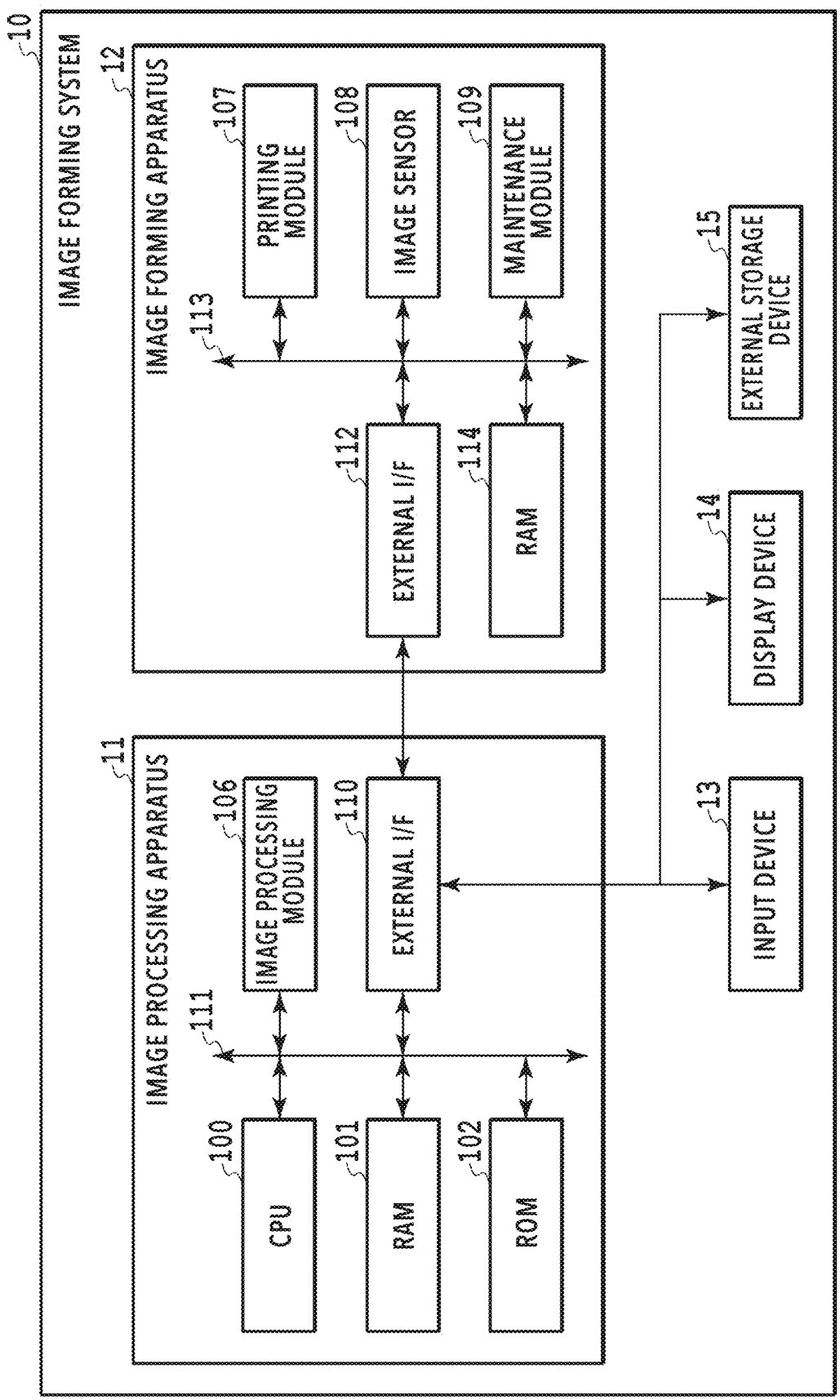
FIG. 1 is a diagram showing a hardware configuration of an image forming system.

FIG. 1 is a diagram showing the hardware configuration of an image forming system 10 according to the present embodiment. The image forming system 10 in the present embodiment has an image processing apparatus 11, an image forming apparatus 12, an input device 13, a display device 14, and an external storage device 15. In the following, components of the image forming system 10 are explained.

The image processing apparatus 11 comprises a CPU 100, a RAM 101, a ROM 102, an image processing module 106, an external I/F (interface) 110, and a bus 111 and functions as a so-called image processing controller. Further, the image processing apparatus 11 is connected to the input device 13, the display device 14, and the external storage device 15 via the external I/F 110.

The CPU (Central Processing Unit) 100 controls the operation of the entire image forming system 10 by using input data and computer programs stored in the RAM 101 and the ROM 102. Here a case is explained as an example where the CPU 100 controls the entire image forming system 10, but it may also be possible to control the entire image forming system 10 by a plurality of pieces of hardware sharing the processing.

The RAM (Random Access Memory) 101 temporarily stores computer programs and data read from the external storage device 15 and data received form the outside via the external I/F 110. Further, the RAM 101 is used as a storage area that is used in a case where the CPU 100 performs various kinds of processing and a storage area that is used in a case where the image processing module 106 performs image processing. The ROM (Read Only Memory) 102 stores setting parameters, boot programs and the like of each unit within the image processing apparatus 11.

The image processing module 106 is implemented by a processor capable of executing computer programs and a dedicated image processing circuit and performs various kinds of image processing for converting image data that is input as a printing target into image data that can be output by the image forming apparatus 12. The configuration may be one in which the CPU 100 performs various kinds of image processing as the image processing module 106 in place of preparing a dedicated processor as the image processing module 106.

The external I/F 110 is an interface for connecting the image processing apparatus 11 and the image forming apparatus 12, the input device 13, the display device 14, and the external storage device 15. Further, the external I/F 110 also functions as a communication interface for performing transmission and reception of data with an external device, not shown schematically, by using infrared communication, a wireless LAN, the internet or the like.

The input device 13 is, for example, a keyboard, a mouse and the like and receives an operation (instruction) by an operator. It is possible for an operator to input various instructions to the CPU 100 via the input device 13. The display device 14 is, for example, a CRT, a liquid crystal display and the like, and displays processing results by the CPU 100 by images, characters and the like. In a case where the display device 14 is a touch panel capable of detecting a touch operation, it may also be possible for the display device 14 to function as part of the input device 13.

The external storage device 15 is, for example, a large-capacity information storage device, such as an HDD and an SSD. In the external storage device 15, the OS, computer programs for causing the CPU 100 to perform various kinds of processing, data and the like are saved. Further, the external storage device 15 also stores various tables and the like, in addition to storing image data that is input and output and temporary data that is generated by the processing of each unit. For example, a color conversion table used in the image processing module 106, a threshold value matrix, information relating to the ink injection of each nozzle, image data of each chart for density characteristic acquisition and non-ejectable nozzle detection, and the like are stored. Computer programs and various kinds of data stored in the external storage device 15 are read appropriately in accordance with the control by the CPU 100 and stored in the RAM 101 and become a target of the processing by the CPU 100.

The image forming apparatus 12 comprises a printing module 107, an image sensor 108, a maintenance module 109, an external I/F 112, a bus 113, and a RAM 114.

Figure 2:
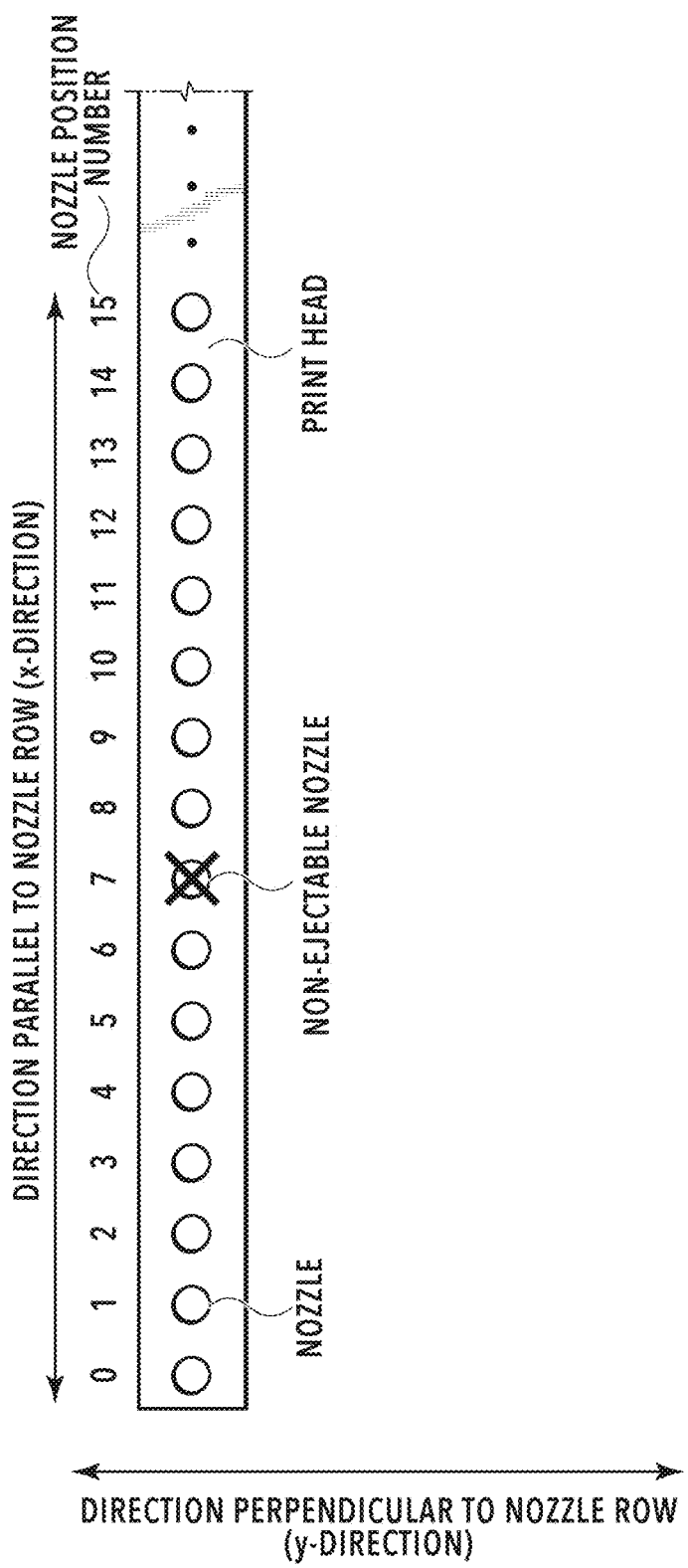
FIG. 2 is a diagram showing a configuration example of a print head.

The external I/F 112 is an interface for connecting the image forming apparatus 12 to the image processing apparatus 11. The RAM 114 is used for storage of data and the like being processed and temporarily stores, for example, image data (halftone image data) for print output, which is acquired from the image processing apparatus 11. The printing module 107 forms an image on a printing medium by the ink jet method based on the halftone image data stored in the RAM 114. The halftone image data is acquired directly from the image processing module 106 of the image processing apparatus 11 or by reading it from the external storage device 15. The print head comprised by the printing module 107 has nozzle rows (printing element columns) corresponding to the number of ink colors, in which a plurality of ink ejectable nozzles (printing elements) is arrayed in one direction. FIG. 2 is a diagram showing a configuration example of the print head. In a case of an image forming system compatible with color printing, typically, the print head mounts four nozzle rows corresponding to each ink of cyan (C), magenta (M), yellow (Y), and black (K). In FIG. 2, for simplification of explanation, only the nozzle row of black (K) is shown schematically. The print head shown in FIG. 2 is a long line head that covers the entire width of a drawing area in the direction (x-direction) parallel to the nozzle row. The print head forms an image on a printing medium by generating dots by ejecting ink droplets while relatively moving the printing medium in the direction (y-direction) perpendicular to the nozzle row, which is perpendicular to the direction parallel to the nozzle row based on a drive signal. In FIG. 2, that the nozzle whose nozzle position number is 7 has become a non-ejectable nozzle is indicated by a x mark. In the present specification, it is assumed that the term "non-ejectable nozzle" generally means a nozzle in the state of not capable of ejecting ink normally and includes a nozzle not capable of ejecting an appropriate amount of ink to an appropriate position. In addition to a nozzle in the state of not capable of ejecting ink at all because of clogging or the like.

The image sensor 108 is a sensor for capturing an image formed on a printing medium by the printing module 107 and the image sensor 108 is, for example, a line sensor and an area sensor. The image sensor 108 functions as a unit configured to detect a non-ejectable nozzle from a captured image and a unit configured to acquire the ink ejection characteristic of each nozzle. It is not necessary for the image sensor 108 to be provided within the image forming apparatus 12 and for example, the image sensor 108 may be an in-line scanner or an offline scanner, not shown schematically, which is connected via the external I/F 110 of the image processing apparatus 11.

The maintenance module 109 performs cleaning processing for recovering the print head comprised by the printing module 107 by removing nozzle clogging. At the method of cleaning processing, for example, there is a method of moving the print head up to a position at which an absorbent material (sponge or the like) of wasted ink is located and forcing the ink head to eject a predetermined amount of ink from each nozzle within the nozzle row. Further, there is a method of pushing out ink forcibly by applying a pressure from the side of an ink tank. Alternatively, there is a method of removing clogging by forcibly sucking ink by applying a negative pressure from the outside of the nozzle. It is assumed that the image forming apparatus 12 of the present embodiment comprises an automatic cleaning mechanism by one of the above-described methods.

<Function Configuration of Image Processing Module 106>

Figure 3:
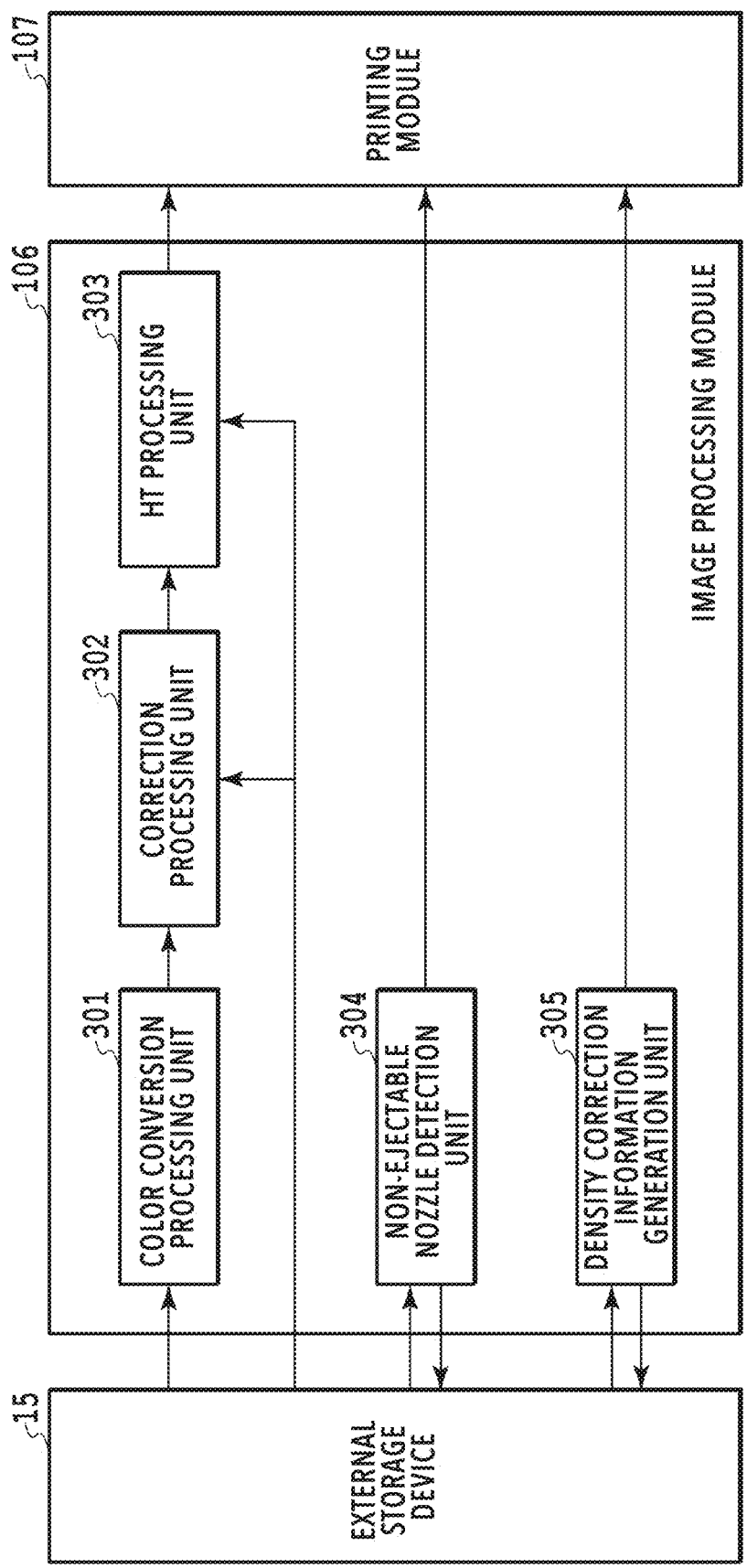
FIG. 3 is a diagram showing a function configuration of an image processing module.

Next, by using FIG. 3, the function configuration of the image processing module 106 is explained. The image processing module 106 has a color conversion processing unit 301, a correction processing unit 302, an HT processing unit 303, a non-ejectable nozzle detection unit 304, and a density correction information generation unit 305. The resolution of the image data that is handled in the image processing module 106 is the same as the resolution of the nozzle arrangement of the print head and for example, 1,200 dpi. In the following, each unit is explained.

The color conversion processing unit 301 converts the input image data from the external storage device 15 into image data corresponding to the color reproduction area of the printing module 107. In the present embodiment, the input image data is 8-bit image data indicating color coordinates (R, G, B) in the color space coordinates, such as sRGB that are the representation colors of a monitor. The color conversion processing unit 301 converts the 8-bit input image data of each of RGB into 8-bit image data of each of R' G' B' corresponding to the color reproduction area of a printer. For the conversion, it is possible to use a publicly known method, such as matrix calculation processing and processing using a three-dimensional lookup table. Further, the color conversion processing unit 301 performs conversion processing to convert the 8-bit image data of each of R' G' B' after the conversion into color signals corresponding to a plurality of inks used in the printer. In a case where the printing module 107 uses, for example, the inks of black (K), cyan (C), magenta (M), and yellow (Y), conversion is performed into 8-bit image data of each of CMYK. This color conversion is also performed by using a three-dimensional lookup table together with interpolation calculation as in the above-described conversion from RGB into R'G'B'. As another conversion method, it is also possible to use a method, such as matrix calculation processing, as in the above.

The correction processing unit 302 performs correction processing for reducing both the density unevenness due to the difference in the nozzle characteristic and the white streak due to a non-ejectable nozzle for the image data of each color plane of CMYK after the color conversion processing based on the density correction information on each nozzle. Details of the correction processing will be described later.

The HT processing unit 303 performs conversion into the number tones that the printing module 107 can represent and halftone processing for determining the dot arrangement for the image data after the correction processing or multi-tone image data stored in the external storage device 15. The HT processing unit 303 of the present embodiment converts image data in which one pixel is represented by eight bits into 1-bit binary halftone image data (output image data) in which each pixel has a value of "0" or "1". In the halftone image data, the pixel whose pixel value (output value) is "0" indicates off of a dot and the pixel whose pixel value (output value) is "1" indicates on of a dot. To the halftone processing, it is possible to apply a publicly known method, such as the error diffusion method and the dither method. The halftone image data generated by the halftone processing is sequentially delivered directly to the printing module 107 within the image forming apparatus 12 or via the RAM 101 or the external storage device 15.

The non-ejectable nozzle detection unit 304 specifies a non-ejectable nozzle (its nozzle position number) in which an ink ejection failure has occurred in each nozzle row based on printing results of a non-ejectable nozzle detection chart that is output from the printing module 107. The non-ejectable nozzle detection chart is printed and output for each ink color (that is, for each nozzle row). For example, in a case where the printing module 107 uses four kinds of ink of CMYK, the non-ejectable nozzle detection chart is output for each ink and a non-ejectable nozzle is specified for each color of CMYK (for each nozzle row). Details of the processing to detect a non-ejectable nozzle will be described later. The processing contents are common to each ink color, and therefore, in the following, explanation is given by taking the nozzle row of the K ink as an example.

The density correction information generation unit 305 generates density correction information that specifies, for each nozzle configuring the nozzle row, an output tone value (density correction value) for an input tone value, with which the density unevenness is reduced in the printing results based on the scanned image obtained by reading the density characteristic acquisition chart. Here, in the density characteristic acquisition chart, at least a patch of uniform density that is for acquiring the characteristic of each nozzle and in which the density is varied stepwise is included. This density characteristic acquisition chart is also printed and output for each ink color. For example, in a case where the printing module 107 uses the four kinds of ink of CMYK, the dedicated chart is output for each ink color and the correction value is derived for each nozzle in the nozzle row of each of CMYK and the density correction information is generated. Details of the density correction information generation processing will be described later. The processing contents of the density correction information generation processing are common to each ink color (each nozzle row) like the non-ejectable nozzle detection processing, and therefore, in the following, explanation is given by taking the nozzle row of the K ink as an example.

The components of the image processing module 106 are not limited to those described above. For example, it may also be possible to additionally comprise a dedicated function unit configured to perform each piece of processing, such as generation of distribution ratio information in the second embodiment, creation of a non-ejection influence template in the third embodiment, and pixel value exchange in the fifth embodiment.

<Non-Ejectable Nozzle Detection Processing>

Figure 4:
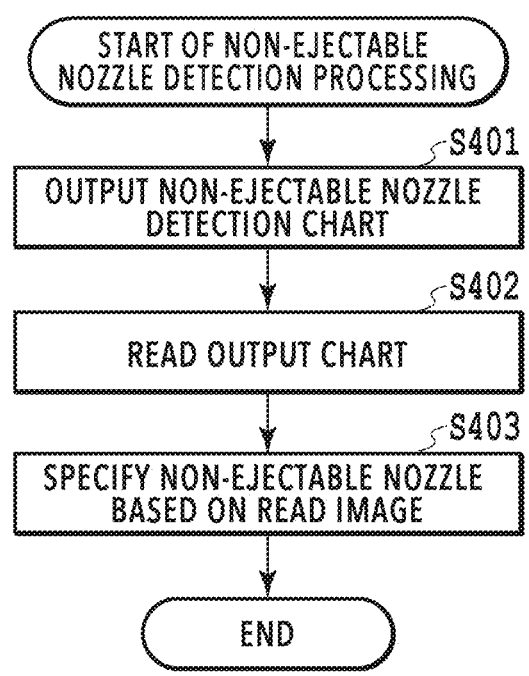
FIG. 4 is a flowchart showing a flow of non-ejectable nozzle detection processing.

Following the above, details of the processing to detect a non-ejectable nozzle in each nozzle row, which is performed by the non-ejectable nozzle detection unit 304, are explained with reference to the flowchart in FIG. 4.

Figures 5A, 5B:
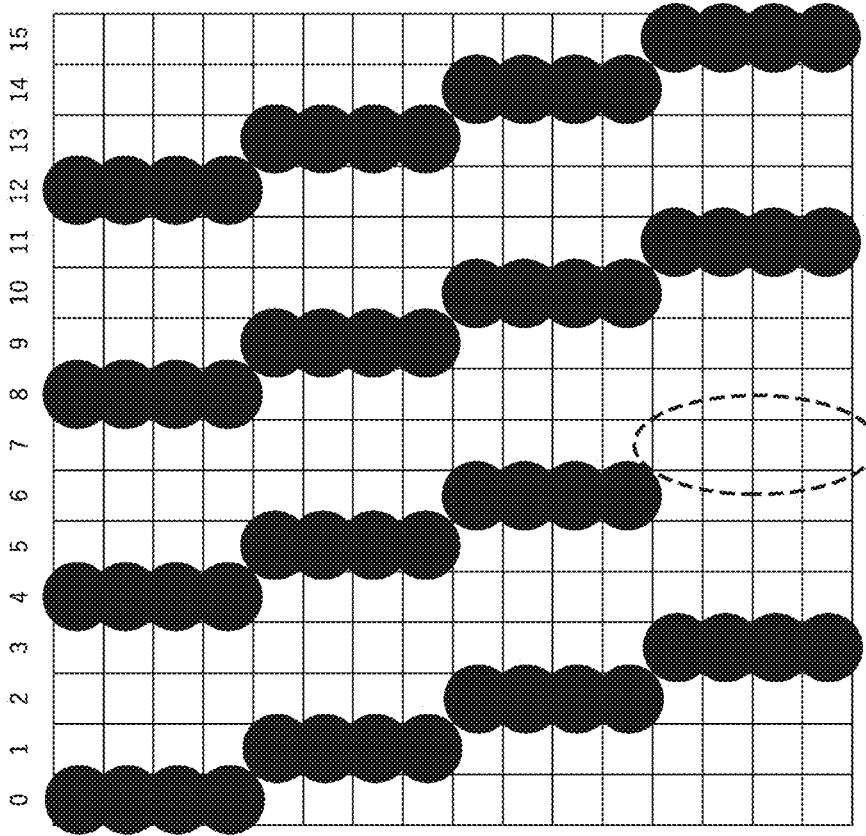
FIG. 5A and FIG. 5B are each a diagram showing an example of a non-ejectable nozzle detection chart.

First, at S401, data of a non-ejectable nozzle detection chart image for which halftone processing has been performed is acquired from the external storage device 15 and transmitted to the printing module 107 along with printing instructions thereof. The printing module 107 having received the printing instructions forms the chart image on a sheet and outputs the sheet. FIG. 5A shows an example of the non-ejectable nozzle detection chart image. The chart image in FIG. 5A has a configuration of 16 vertical pixels× 16 horizontal pixels and the numerical value ("0" or "255") of each pixel indicates the tone value. Further, the figures from 0 to 15 attached at the top of the chart image each indicate the nozzle position number corresponding to each pixel column and it is assumed that the correspondence between this nozzle position number and the nozzle position number in each nozzle row comprised by the print head shown in FIG. 2 is maintained. In the non-ejectable nozzle detection chart, a rectangle (including four pixels in the example in FIG. 5A) in the shape of a line is arranged so that it is possible to determine whether or not ink is ejected for each nozzle.

Next, at S402, the non-ejectable nozzle detection chart that is output from the printing module 107 is read by the image sensor 108.

Then, at S403, based on the read image (scanned image) of the non-ejectable nozzle detection chart obtained at S402, the position of a non-ejectable nozzle is specified. FIG. 5B is a diagram schematically showing a scanned image in a case where the nozzle whose nozzle position number is 7 is detected as a non-ejectable nozzle. As shown in FIG. 5B, in a case w % here a non-ejectable nozzle exists, the line that should be originally formed at the nozzle position is not formed. By causing the line that is not formed to correspond to the nozzle position number in this manner, it is possible to specify the position of the non-ejectable nozzle in each nozzle row.

The above is the contents of the non-ejectable nozzle detection processing.

<Density Correction Information Generation Processing>

Figure 6:
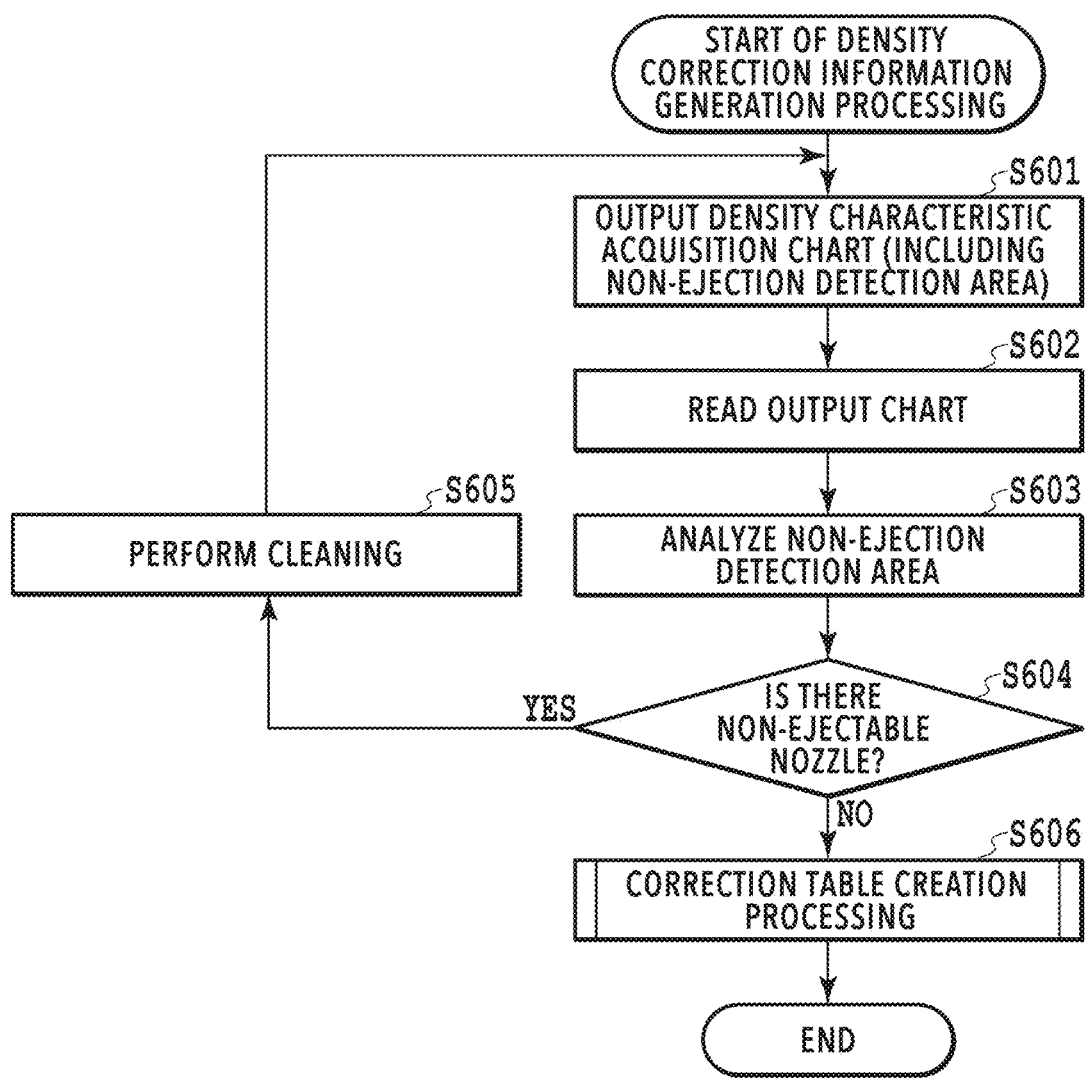
FIG. 6 is a flowchart showing a flow of density correction information generation processing according to a first embodiment.

Next, details of the processing to generate a correction table used in the correction processing for suppressing density unevenness, which is performed by the density correction information generation unit 305, are explained with reference to the flowchart in FIG. 6. Here, explanation is given by taking a case as an example where as density correction information, a correction table in an LUT (lookup table) form is generated, in which a plurality of input tone values that vary stepwise and correction values (output tone values) are associated with each other. However, the LUT form is an example and this is not limited and density correction information may be accepted in which the correction value for a certain input tone value is determined by using a mathematical formula or a function.

Figure 7:
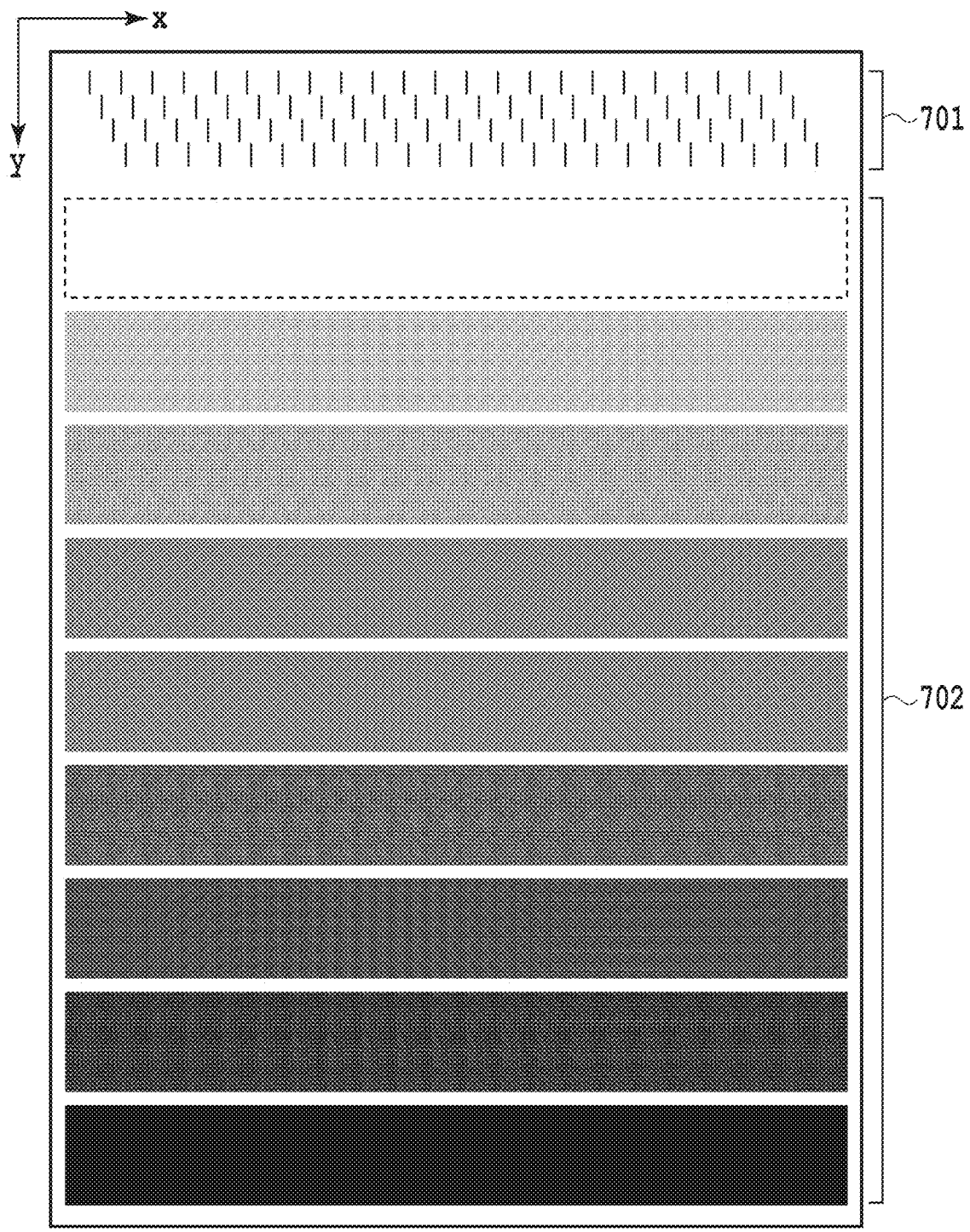
FIG. 7 is a diagram showing an example of a density characteristic acquisition chart.

First, at S601, data of a density characteristic acquisition chart image for which halftone processing has been performed is acquired from the external storage device 15 and transmitted to the printing module 107 along with printing instructions thereof. The printing module 107 having received the printing instructions forms the density characteristic acquisition chart image on a sheet and outputs the sheet. FIG. 7 shows an example of the density characteristic acquisition chart according to the present embodiment. The density characteristic acquisition chart image in the present embodiment includes two kinds of image area, that is, a non-ejection detection area 701 and a density patch area 702. The non-ejection detection area 701 is an image area for detecting the nozzle position number in a case where there is a non-ejectable nozzle and for example, may be the same chart as the non-ejectable nozzle detection chart described previously. The density patch area 702 is an image area for acquiring the density characteristic of each nozzle in each nozzle row configuring the print head. In the density patch area 702 shown in FIG. 7, nine kinds of rectangular patch of uniform density in which the density is varied at nine levels are formed.

Next, at S602, the density characteristic acquisition chart that is output from the printing module 107 is read by the image sensor 108. The color space of the read image (scanned image) of the density characteristic acquisition chart is arbitrary, but here, it is assumed that the read image is an image of three channels of RGB. Then, it is assumed that the scanned image of the three channels of RGB is configured into a scanned image of one channel by a color conversion table prepared in advance in accordance with the reading characteristic of the image sensor 108. Here, the color conversion table is a table that converts the pixel value of the image into a value linear to density, for example, such as the Y value in the CIEXYZ color space and the L* value in the CIEL*a*b* color space. Further, in a case where each patch on the printed and output chart is formed by a color ink, such as cyan, magenta, and yellow, it may also be possible to use a value corresponding to saturation in place of a value corresponding to brightness. For example, it may also be possible to use RGB values as values corresponding to the complementary colors of cyan, magenta, and yellow, respectively. In the present embodiment, it is assumed that the scan resolution is 1,200 dpi the same as the resolution of the nozzle arrangement of the print head.

Next, at S603, the non-ejection detection area 701 on the read image (scanned image) obtained at S602 is analyzed and in a case where a non-ejectable nozzle is detected, the nozzle position thereof is specified. In a case where a non-ejectable nozzle is detected, the nozzle position number of the nozzle is stored in the external storage device 15 as non-ejectable nozzle information. In a case where the non-ejection detection area 701 is detected from the scanned image, it may be possible to apply a publicly known method, for example, such as a pattern matching method and a method that uses a position marker (not shown schematically).

At S604, based on the analysis results of the non-ejection detection area at S603, the next processing contents are determined. In a case where a non-ejectable nozzle is detected as a result of the analysis, the processing advances to S605 and in a case where no non-ejectable nozzle is detected, the processing advances to S606.

At S605, the maintenance module 109 is instructed to perform cleaning processing for recovering the print head. Then, in the maintenance module 109 having received the instructions, the cleaning processing is performed. At the same time as that, the scanned image data of the dedicated chart that is read at S602 is discarded. In a case where the cleaning processing is completed, the processing returns to S601 and the processing at S601 to S604 is repeated again. That is, each time the density characteristic acquisition chart is output, an attempt is made to recover the non-ejectable nozzle by performing the cleaning processing. It may also be possible to design a configuration in which the number of times the cleaning processing at 605 is performed is counted and in a case where the count value exceeds a predetermined number of times, a user is notified of an error and the density correction information generation processing is not performed until, for example, the print head is exchanged with another.

Figure 8:
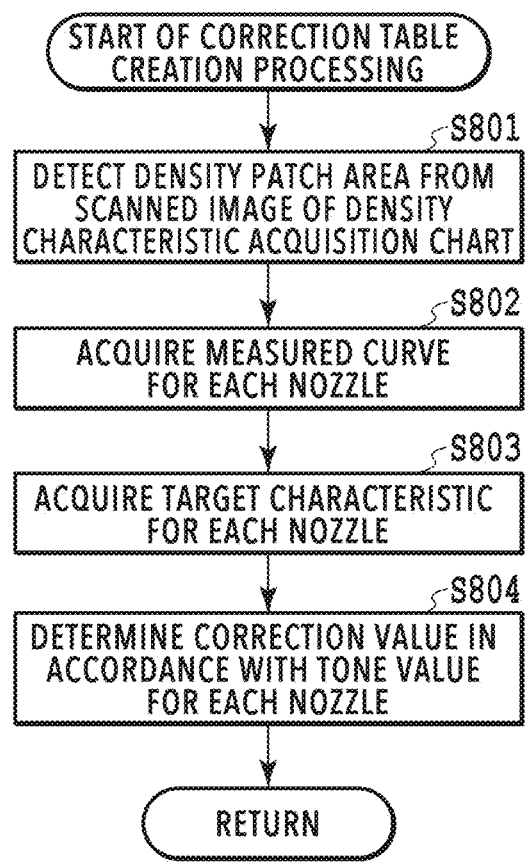
FIG. 8 is a flowchart showing a flow of correction table creation processing.

At S606, processing to create a correction table excluding the influence of a non-ejectable nozzle is performed by calculating the correction value corresponding to the input tone value for each nozzle based on the scanned image acquired at S602. FIG. 8 is the flowchart showing details of correction table creation processing. In the following, explanation is given along the flow in FIG. 8.

Figure 9A:
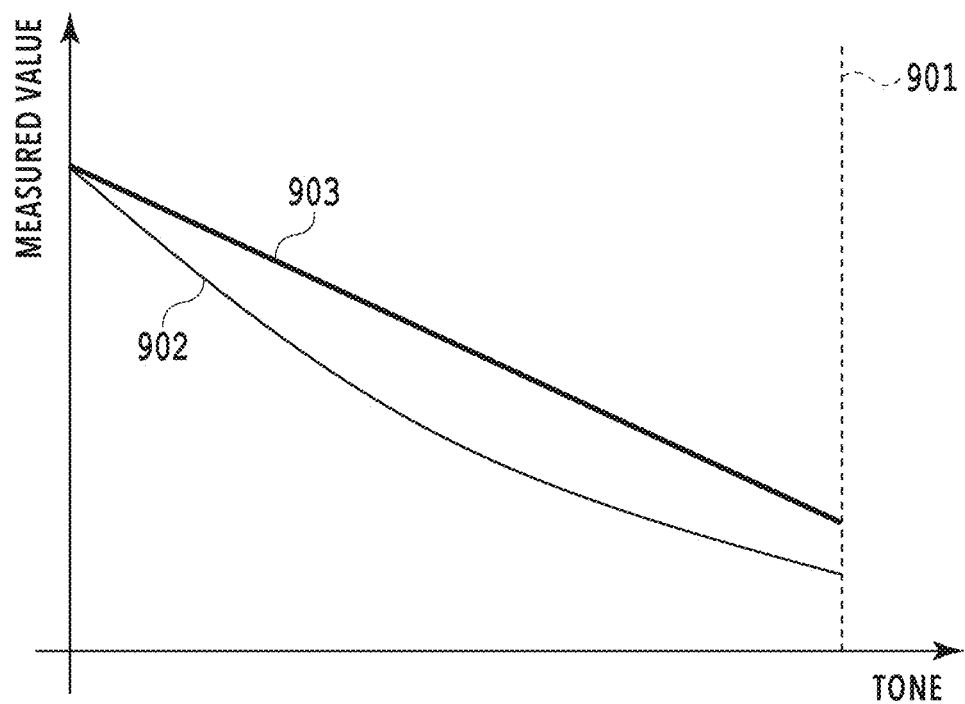
FIG. 9A and FIG. 9B are each a diagram explaining a derivation method of a correction value for an input tone value.

First, at S801, from the scanned image of the density characteristic acquisition chart acquired at S602, the density patch area 702 is detected. At S802 that follows, from the detected density patch area 702, a measured curve corresponding to each nozzle is acquired. Here, the measured curve is a curve indicating a correspondence relationship between the tone value corresponding to each nozzle and the measured signal value on the scanned image. FIG. 9A shows an example of the measured curve. In FIG. 9A, the horizontal axis represents the input signal value (input tone value) of the density patch area 702 and the vertical axis represents the signal value (to be strict, the value after three channels of RGB are converted into one channel indicating density. In the following, described as "measured value") that is measured from the scanned image. Further, in FIG. 9A, a broken line 901 indicates the upper limit value of the horizontal axis and in a case of an 8-bit input signal value, the upper limit value is "255". Then, a curve 902 in FIG. 9A indicates a measured curve obtained by the measured value corresponding to each tone value of the density patch area 702 and the results of interpolation calculation thereof. In the present embodiment, as the interpolation method, section linear interpolation is used. However, the interpolation method may be any one and it may also be possible to use a publicly known spline curve. The measured curve represents the density characteristic of the nozzle corresponding to a pixel position x and is obtained corresponding to the number of nozzles used at the time of forming the density characteristic acquisition chart image on the sheet. A different measured curve is obtained for each nozzle and for the nozzle whose ink ejection amount is small, the measured curve shifts in the upward direction (in the direction in which brightness becomes higher) and for the nozzle whose ink ejection amount is large, the measured curve shifts in the downward direction (in the direction in which brightness becomes lower). At next S803, a target characteristic corresponding to each nozzle is acquired. Here, the target characteristic is the target density characteristic determined in advance in accordance with the measured curve of each nozzle. A straight line 903 (a set of measured values that are linear to the tone) in FIG. 9A indicates the target characteristic.

Figure 9B:
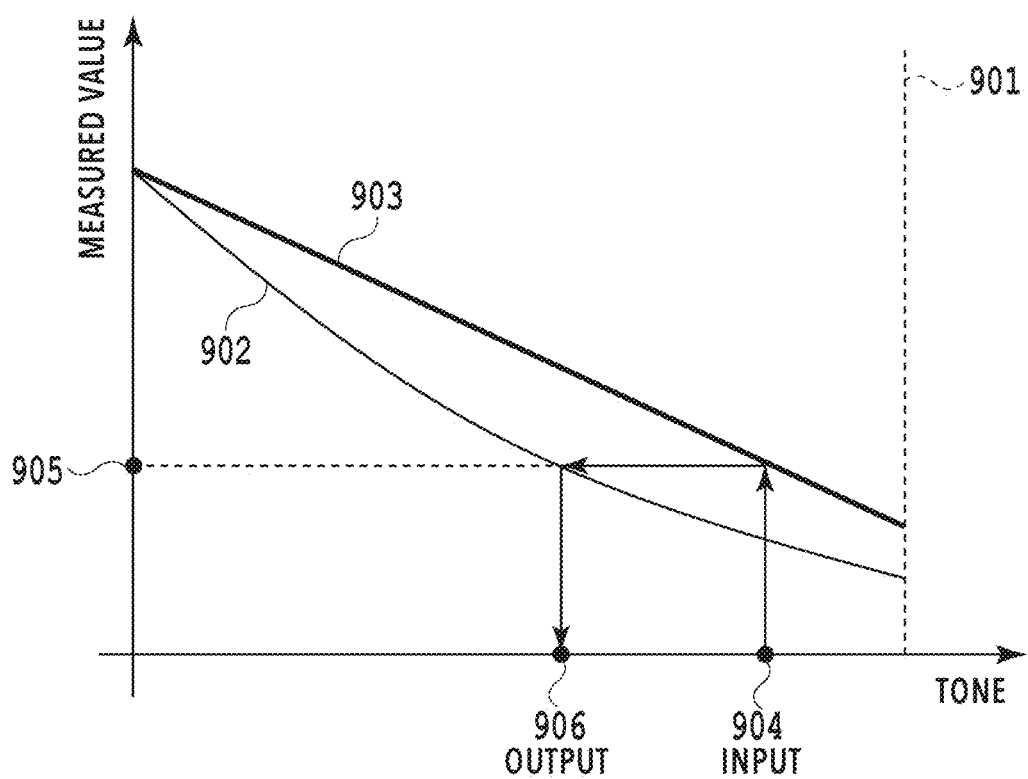

Then, at S804, based on the measured curve acquired at S802 and the target characteristic acquired at S803, the correction value in accordance with each tone value is determined for each nozzle. FIG. 9B is a diagram explaining how to find the correction value. First, the nozzle position number of the derivation-target nozzle of interest and the input tone value for which it is desired to find the correction value are acquired. In FIG. 9B, a point 904 on the horizontal axis indicates the input tone value. Next, the target density value corresponding to the input tone value 904 is found from the target characteristic 903. In FIG. 9B, a point 905 on the vertical axis indicates the target density value that is found from the input tone value 904 and the target characteristic 903. Then, from the measured curve 902 of the nozzle of interest, the tone value corresponding to the target density value 905 is found and determined as the correction value (output tone value) corresponding to the input tone value 904. In FIG. 9B, a point 906 on the horizontal axis indicates the correction value (output tone value) 906 corresponding to the input tone value 904. By performing the processing such as this for a plurality of tone values determined in advance, a correction table for the nozzle of interest is obtained in which the output tone value (correction value) is associated with a predetermined input tone value. In place of finding each individual correction value corresponding to all the input tone values from 0 to 255, it may also be possible to find only the correction values corresponding to representative tone values (for example, nine tone values corresponding to the density patches). In that case, at the time of performing the correction processing using the correction table, for the input tone value that is not specified within the table, it is sufficient to find the corresponding correction value by interpolation processing.

In a case where the above-described processing is completed for all the nozzles of each nozzle row, the created correction table is stored in the external storage device 15 and this processing is terminated.

The above is the contents of the density correction information generation processing. It is necessary to complete the creation of the correction table before the start of execution of the printing processing based on user instructions and the creation of the correction table is performed at the time of shipment of the system or at the time of attachment of the print head. Further, the creation or updating of the correction table is performed at predetermined timing designated by a user, such as the timing at which the print head is exchanged with another. Alternatively, it may also be possible to evaluate the correction table at arbitrary timing and update the correction table in a case where the correction value deviates from the appropriate correction value due to a change in the nozzle characteristic or the like.

<Flow of Printing Processing>

Figure 10:
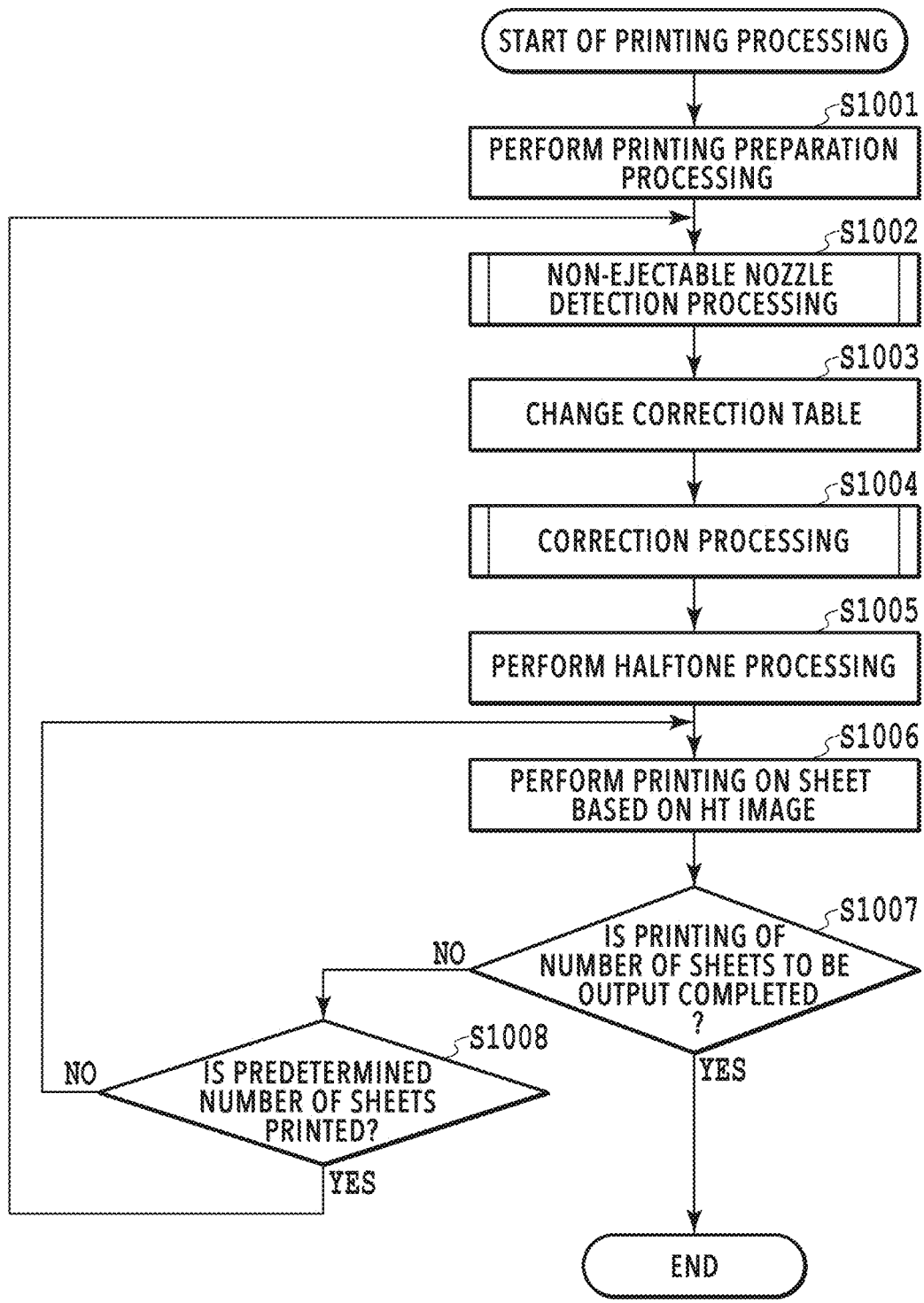
FIG. 10 is a flowchart showing a flow of printing processing in the image forming system.

Following the above, the flow of the printing processing in the image forming system 10 is explained along the flowchart shown in FIG. 10. In the process of this printing processing, the correction processing using the correction table created by the above-described method is performed. Before giving a detailed explanation along the flow in FIG. 10, the design concept of the printing processing according to the present embodiment is explained.

The white spot resulting from a non-ejectable nozzle is likely to be conspicuous perceptually compared to the density unevenness due to a difference in the nozzle characteristic. Because of this, in a case where the white spot occurs, it is preferable to detect it quickly and perform complementation. Further, in order to detect a non-ejectable nozzle, it is only required to determine whether or not ink is ejected, and therefore, the number of dedicated charts to be output is small and the processing time required for non-ejectable nozzle detection is short compared to those of the density correction information generation processing. On the other hand, the density unevenness results from the variation in the ejection characteristic (ejection amount/ejection direction/ejection speed) at the time of manufacturing of the print head, the inclination of the head at the time of attachment of the print head, the crosstalk at the time of the drive of the print head, and the like, and the density unevenness is unlikely to change over time. However, the characteristic of each nozzle is not linear to the input level, and therefore, the number of dedicated charts to be output increases and the processing time required for derivation of the correction value is prolonged compared to those of the non-ejectable nozzle detection. Because of this, it is desirable to reduce the execution frequency of the density correction information generation processing whose processing load is large as low as possible. On the other hand, as regards the non-ejectable nozzle detection processing whose processing load is small, it is preferable to maintain the printed image quality by increasing the execution frequency thereof. The printing processing designed based on the above-described basic concept is performed based on user instructions. The series of processing shown in the flow in FIG. 10 is started by a user designating the file name of printing-target image data and the number of sheets to be printed, and giving instructions to perform the processing via the input device 13.

First, at S1001, printing preparation processing is performed in the image processing apparatus 11. Specifically, first, printing-target image data is read from the external storage device 15 based on the file name designated by a user and sent to the image processing module 106, and color conversion processing is performed in the color conversion processing unit 301. Further, a number of sheets to be output N designated by a user is set to the RAM 101 or the like and further, a counter Cn_p that counts the number of printed and output sheets is initialized (count value=0). In a case where the printing preparation processing is completed, the processing advances to S1002.

At S1002, the non-ejectable nozzle detection processing described previously (see the flow in FIG. 4) is performed. The results of the non-ejectable nozzle detection processing are saved in the external storage device 15 as non-ejectable nozzle information.

At S1003 that follows, based on the non-ejectable nozzle information generated at S1002, the correction value corresponding to the non-ejectable nozzle in the correction table is changed. Specifically, among the correction values of each tone value specified in association with the nozzle position number in the correction table, the correction values corresponding to the found non-ejectable nozzle and the peripheral nozzles thereof are changed so that the white spot that occurs due to the non-ejectable nozzle becomes unlikely to be perceived. Here, a more detailed explanation is given by using a specific example. FIG. 11A shows the correction table before being changed, which has been obtained by the density correction information generation processing. In the correction table in FIG. 11A, correction values corresponding to nine tones x number of nozzles are stored. For example, in a case where the input tone value of a printing-target image is "32", the correction value (output tone value) corresponding to the nozzle position number 1 is "34". Here, it is assumed that the nozzle whose nozzle position number is n is detected as a non-ejectable nozzle in the non-ejectable nozzle detection processing at S1002 described above. FIG. 11B shows the correction table after being changed at this time. As shown in FIG. 11B, in the correction table after being changed, all the correction values of the nth nozzle, which is the non-ejectable nozzle, are changed to "0". Changing the correction values of a certain nozzle to "0" means that control is performed so that the nozzle does not eject ink. By changing the correction values in this manner, it is possible to suppress a black streak from occurring even in a case where the non-ejectable nozzle recovers unexpectedly during the printing processing. Further, in the example shown in FIG. 11B, correction values I' of the (n+1)th nozzle and the (n−1)th nozzle are changed to I+Ix/2. Here, I represents the correction value before being changed and Ix represents the correction value before being changed of the nth nozzle that has become the non-ejectable nozzle. However, in a case where I' exceeds the maximum value (in the example in FIG. 11A and FIG. 11B, 255) of the tone value, I' is clipped to the maximum value. The correction values are changed so that the density that has originally been in the charge of the non-ejectable nozzle is made up for by the peripheral nozzles adjacent to the non-ejectable nozzle. As a result of that, the number of dots or the dot size on the periphery of the non-ejectable nozzle increases, and thereby, it is possible to suppress a white spot caused by the non-ejectable nozzle. In a case of clipping the correction value I' after being changed to the maximum value because the correction value I' exceeds the maximum value of the tone value, it may also be possible to allocate the tone value corresponding to the clipped value to the non-ejectable nozzle. In this case, even on the condition that the non-ejectable nozzle recovers naturally, dots are generated only in the portion in which density is short, and therefore, a black streak does not occur. On the other hand, the non-ejectable nozzle is driven without being masked, and therefore, the possibility of natural recovery becomes strong.

Next, at S1004, for the printing-target image after the color conversion, the correction processing using the changed correction table is performed in the correction processing unit 302. Details of the correction processing will be described later. At S1005 that follows, for the corrected printing-target image, the halftone processing is performed in the HT processing unit 303. Then, the generated halftone image data is sent to the image forming apparatus 12 via the external I/Fs 110 and 112.

Next, at S1006, in the printing module 107 of the image forming apparatus 12, printing using the halftone image data received from the image processing apparatus 11 is performed and the image designated by a user is formed on a sheet. At this time, the value of the counter Cn_p described previously is incremented (+1). In a case where one sheet is printed and output, the processing advances to S1007.

Then, at S1007, whether or not printing of the number of sheets to be output N, which is set at S1001, is completed is determined. Specifically, whether or not the value of the counter Cn_p is equal to the value of the number of sheets to be output N is determined. In a case where the value of the counter Cn_p is equal to the value of the number of sheets to be output N, this printing processing is terminated. On the other hand, in a case where the value of the counter Cn_p is not equal to the value of the number of sheets to be output N, the processing advances to S1008.

At S1008, whether or not the value of the counter Cn_p has reached a predetermined number of sheets determined in advance is determined. Here, the predetermined number of sheets that is used as a threshold value is, for example, a multiple of 200 or the like. In a case where the value of the counter Cn_p has reached the predetermined number of sheets, the processing returns to S1002 and the detection of a non-ejectable nozzle, the change of the correction table, and the correction processing based on the changed correction table are performed again. On the other hand, in a case where the value of the counter Cn_p has not reached the predetermined number of sheets, the processing returns to S1006 and printing is continued.

The above is the contents of the printing processing according to the present embodiment. By performing the non-ejectable nozzle detection processing each time a predetermined number of sheets is printed, it is possible to deal with even a case without a break where a non-ejectable nozzle occurs during printing. Further, the correction table is created in advance so that the influence of a non-ejectable nozzle is not included, and therefore, in a case where the non-ejectable nozzle recovers, it is possible to correct the density that is in the charge of the nozzle and the peripheral nozzles without the need to create the correction table again.

It is premised that the density correction information generation processing to create the correction table is performed before the start of the printing processing, but it is not necessary to perform the density correction information generation processing each timer prior to the input of printing instructions by a user and it is sufficient to perform the density correction information generation processing at timing at which a predetermined time elapses or a predetermined number of processed sheets is reached. Alternatively, it may also be possible to perform the density correction information generation processing based on a predetermined event, such as exchange of the print head and turning on/off of the electric power source of the image forming system. Further, in a case where the number of sheets to be output that is designated is very large, it may also be possible to perform the density correction information generation processing as interrupt processing at the pint in time at which a predetermined time (for example, two hours) elapses or a predetermined number of processed sheets (for example, 1,000 sheets) is reached.

<Density Correction Processing>

Figure 12:
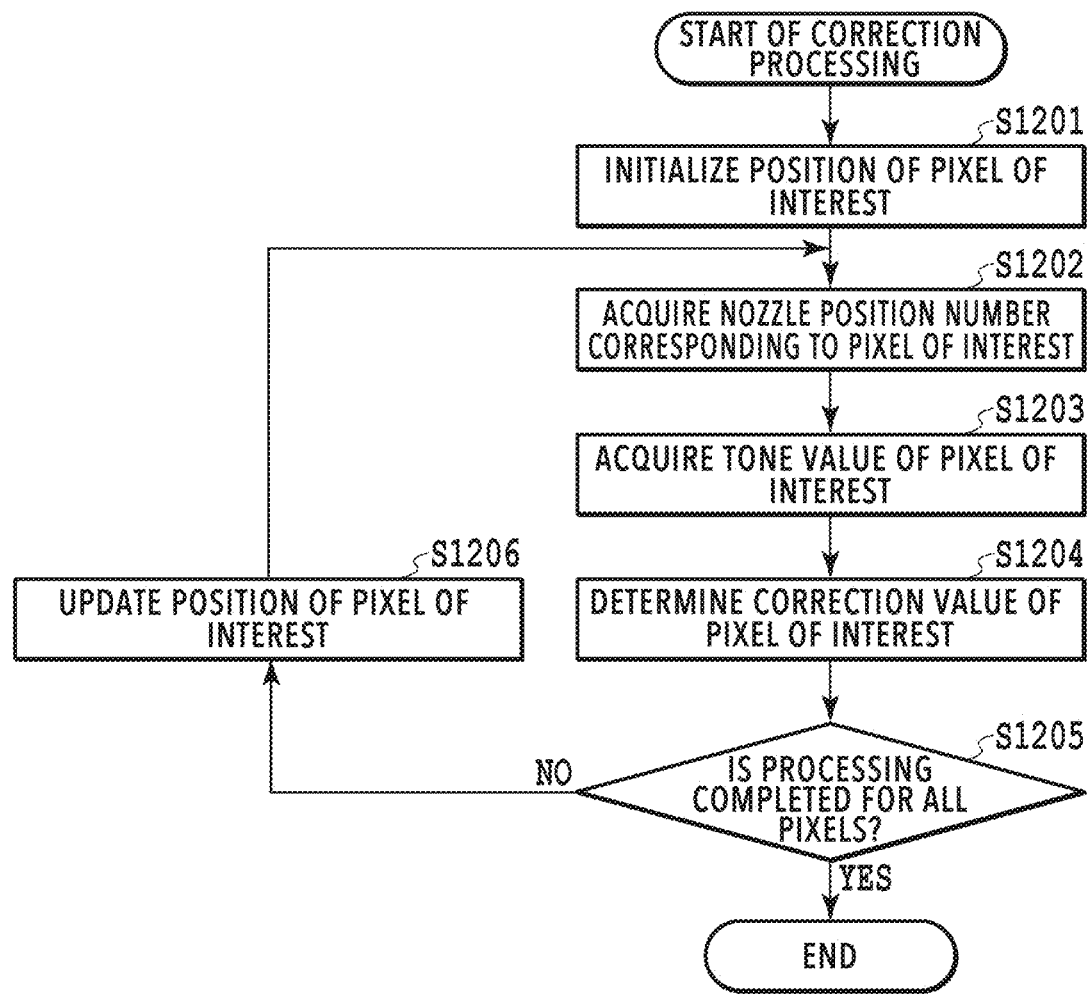
FIG. 12 is a flowchart showing a flow of correction processing.

Next, details of the above-described correction processing (S1004) are explained by taking a case as an example where the changed correction table shown in FIG. 11B is used. FIG. 12 is a flowchart showing a flow of processing in the correction processing unit 302. In the following, a detailed explanation is given along the flow in FIG. 12.

First, at S1201, the position of the pixel of interest in the image data after color conversion, which is the processing target, is initialized. Due to this, for example, the pixel at coordinates (x, y)=(0, 0) in the image after color conversion is determined as the first pixel of interest.

Next, at S1202, a nozzle position number x corresponding to the pixel of interest is acquired. For example, in a case where the dot at the position of the pixel of interest (x, y)=(1, 1) is formed by the nozzle whose nozzle position number is 1, the corresponding nozzle position number x=0 is acquired.

Next, at S1203, from the image data after color conversion, a tone value i of the pixel of interest is acquired. At S1204 that follows, a correction value (output tone value) i' of the pixel of interest is determined based on the changed correction table. Specifically, the correction value i' corresponding to the nozzle position number x acquired at S1202 and the tone value i acquired at S1203 is determined with reference to the changed correction table. Here, it is assumed that the tone value i of the pixel of interest is 32. Here, the determination is performed m accordance with the correction table in FIG. 11B, and therefore, in a case where the nozzle position number x is 1, the correction value i' is 34 and in a case where the nozzle position number x is n, the correction value i' is 0. In a case where the corresponding tone value does not exist within the correction table, for example, such as a case where i=48, it is sufficient to determine i' to be 52 by performing linear interpolation processing.

Next, at S1205, whether or not the correction value is determined for all the pixels in the image data after color conversion, which is the processing target, is determined. In a case where the correction value is already determined for all the pixels, this correction processing is terminated. On the other hand, in a case where a pixel for which the correction value is not determined yet exists, the processing advances to S1206 and the position of the pixel of interest is updated. After the updating, the processing returns to S1202 and the determination of the correction value for the new pixel of interest is continued.

The above is the contents of the correction processing based on the correction table.

As above, in the present embodiment, the output of the density characteristic acquisition chart is performed a plurality of times until the condition that the non-ejectable nozzle is no longer detected is satisfied. By repeatedly performing the chart output until the non-ejectable nozzle is no longer detected in this manner, the appropriate correction values for all the nozzles configuring the nozzle row are obtained and the correction table not including the influence of the non-ejectable nozzle is created. The created correction table does not include the influence of the non-ejectable nozzle, and therefore, even in a case where the non-ejectable nozzle recovers, it is not necessary to create the correction table again, leading to suppression of the downtime, saving of the ink and the sheet required for output of a dedicated chart.

Second Embodiment

In the first embodiment, by distributing the correction value of a non-ejectable nozzle to the correction values of the nozzles (in the following, described as "adjacent nozzles") adjacent to the non-ejectable nozzle from left and right, it is made possible to suppress both the density unevenness and the white spot due to a non-ejectable nozzle. In the second embodiment, more appropriate density correction processing is implemented by determining in advance a distribution ratio of the correction value in accordance with the tone value of a non-ejectable nozzle and storing the distribution ration in a form of a table or the like. Explanation of the contents common to those of the first embodiment, such as the system basic configuration, is omitted or simplified and in the following, contents of distribution ratio determination processing, which is the feature of the present embodiment, are explained mainly.

<Distribution Ratio Determination Processing>

Figure 13:
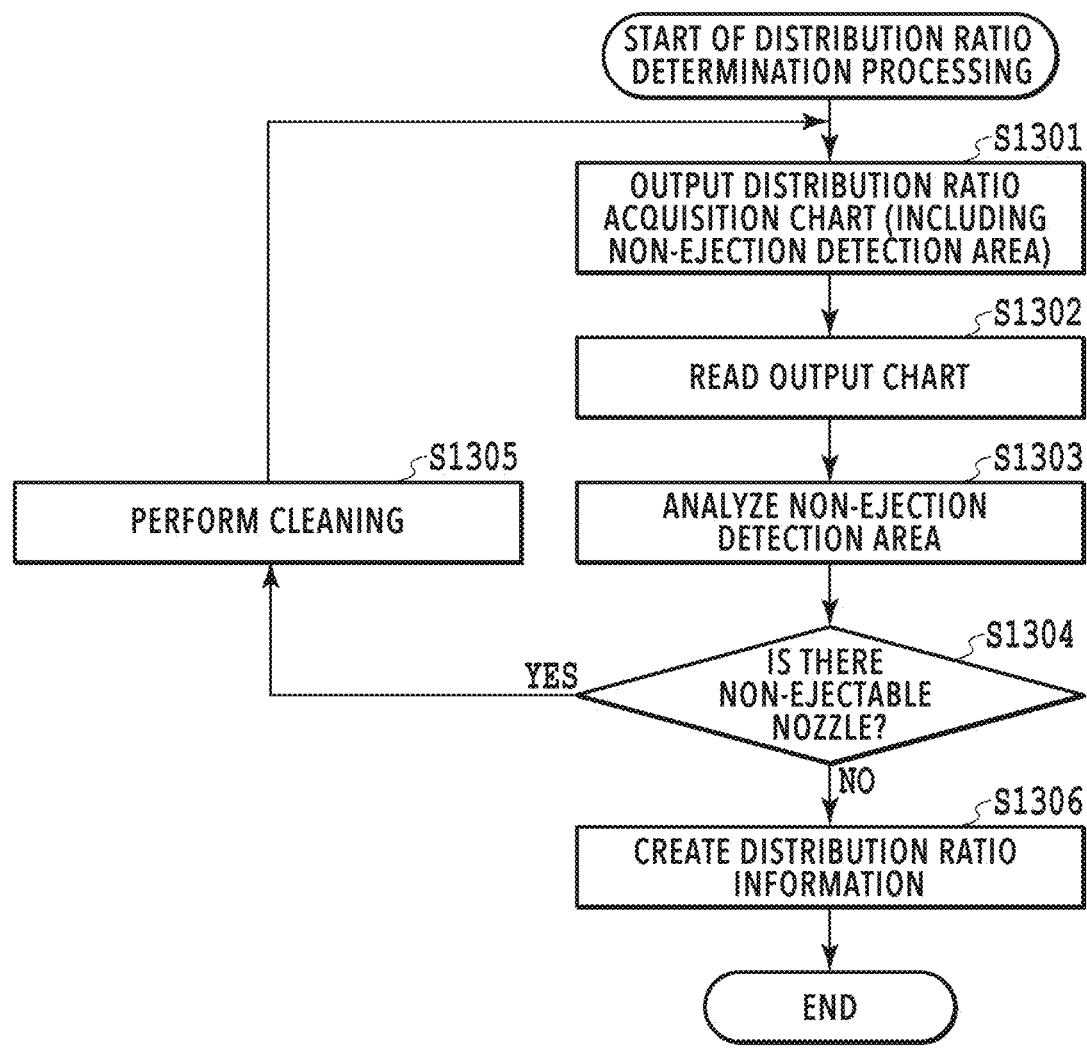
FIG. 13 is a flowchart showing a flow of correction value distribution ratio determination processing.

In the present embodiment, following the density correction information generation processing described previously, processing to determine a correction value distribution ratio is performed by a distribution ratio information generation unit (not shown schematically) within the image processing module 106. In the following, a detailed explanation is given along the flowchart shown in FIG. 13.

Figure 14:
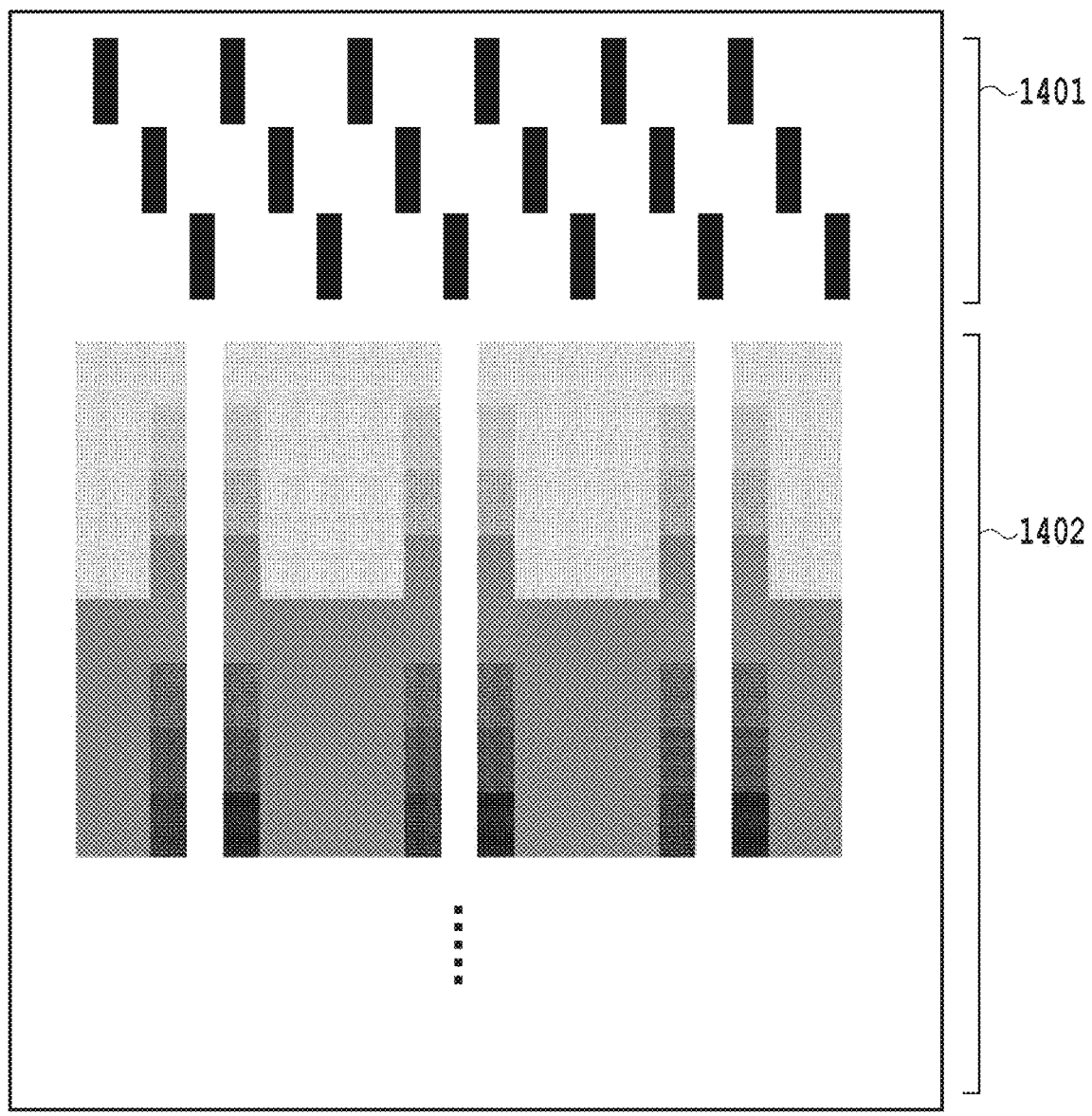
FIG. 14 is a diagram showing an example of a distribution ratio acquisition chart.

First, at S1301, data of a distribution ratio acquisition chart image for which halftone processing has been performed is acquired from the external storage device 15 and transmitted to the printing module 107 along with printing instructions thereof. The printing module 107 having received the printing instructions forms the distribution ratio acquisition chart image on a sheet and outputs the sheet. FIG. 14 shows an example of a distribution ratio acquisition chart according to the present embodiment. The distribution ratio acquisition chart image in the present embodiment includes two kinds of image area, that is, a non-ejection detection area 1401 and a distribution ratio derivation area 1402. The non-ejection detection area 1401 is an image area for detecting the nozzle position number in a case where there is a non-ejectable nozzle and for example, may be the same chart as the non-ejectable nozzle detection chart described previously. The distribution ratio derivation area 1402 is an image area for determining an optimum distribution ratio for each tone. In the distribution ratio derivation area 1402 shown in FIG. 14, for the uniform-density patches of different tones, "0" is allocated to the tone value of the nozzle of a predetermined nozzle position number intentionally at predetermined intervals so that a dot is not formed in the nozzle whose tone value is "0". In the following, the nozzle of the nozzle position number whose tone value is set to "0" intentionally is called "intentional non-ejectable nozzle". Further, in the adjacent nozzles adjacent to the intentional non-ejectable nozzle from left and right, the tone values are changed in different distribution ratios (here, at four levels). In this manner, in the distribution ratio acquisition chart, for the rectangular patch of uniform density, in which the density is made different at a plurality of levels, non-ejectable nozzles are caused to appear intentionally at predetermined intervals.

Next, at S1302, a distribution ratio acquisition chart that is output from the printing module 107 is read by the image sensor 108. The color space of the read image (scanned image) of the distribution ratio acquisition chart is, for example, RGB, that is, the image is an image of three channels of RGB and it is assumed that the image is converted into a scanned image of one channel by a color conversion table prepared in advance.

Next, at S1303, the non-ejection detection area 1401 on the read image (scanned image) obtained at S1302 is analyzed and in a case where a non-ejectable nozzle is detected, the nozzle position thereof is specified. In a case where a non-ejectable nozzle is detected, the nozzle position number of the nozzle is stored in the external storage device 15 as non-ejectable nozzle information.

At S1304, based on the analysis results of the non-ejection detection area at S1303, the next processing contents are determined. In a case where a non-ejectable nozzle is detected as a result of the analysis, the processing advances to S1305 and on the other hand, in a case where no non-ejectable nozzle is detected, the processing advances to S1306.

At S1305, the maintenance module 109 is instructed to perform cleaning processing for recovering the print head. Then, in the maintenance module 109 having received the instructions, the cleaning processing is performed. At the same time as that, the scanned image data of the dedicated chart read at S1302 is discarded. In a case where the cleaning processing is completed, the processing returns to S1301 and the processing at S1301 to S1304 is repeated again. That is, each time the distribution ratio acquisition chart is output, an attempt is made to recover the non-ejectable nozzle by performing the cleaning processing. It may also be possible to design a configuration in which the number of times the cleaning processing at S1305 is performed is counted and in a case where the count value exceeds a predetermined number of times, a user is notified of an error and the distribution ratio determination processing is not performed until, for example, the print head is exchanged with another.

Figure 15:
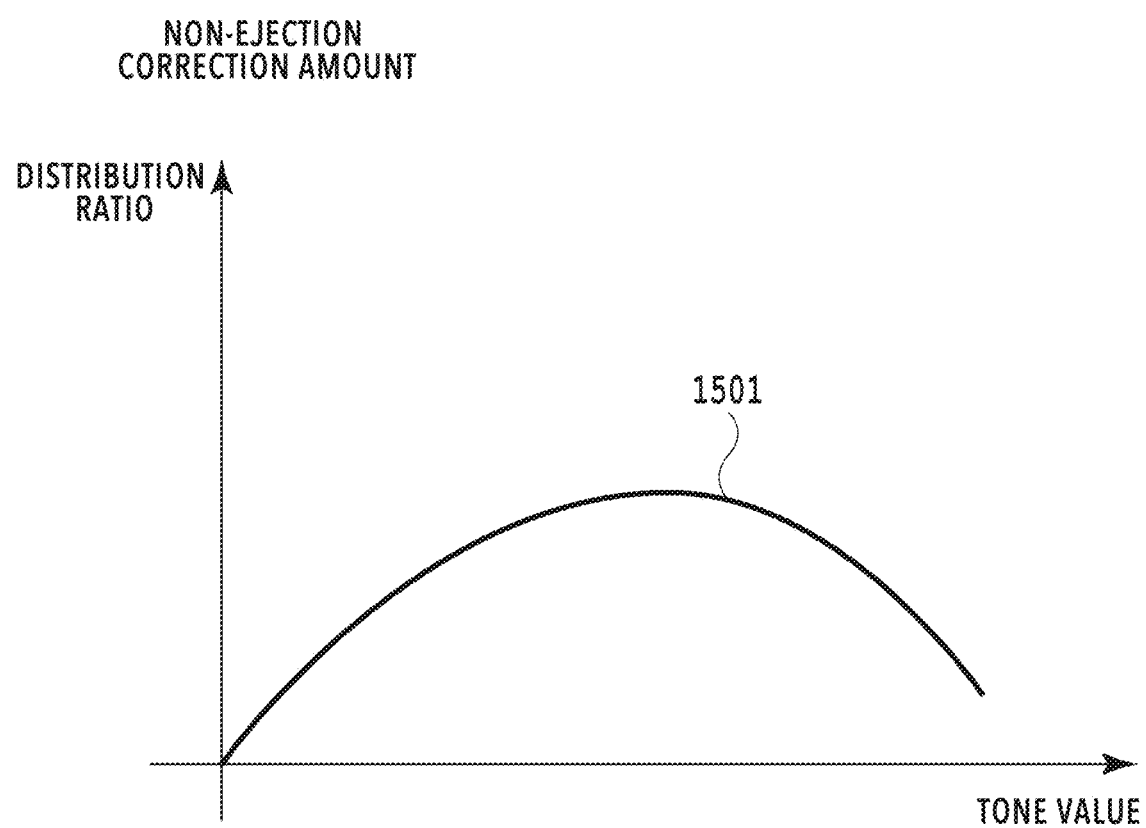
FIG. 15 is a diagram showing an example of a distribution ratio in accordance with a tone value.

At S1306, based on the scanned image acquired at S1302, the distribution ratio in accordance with the tone value is determined. In the determination of the distribution ratio, for example, a distribution ratio is selected for each tone value, with which the density becomes the most uniform in a case where a publicly known spatial filter is applied to the scanned image. At this time, depending on the kind of printing medium to be used (plain paper, glossy paper, mat paper and the like) or the characteristic of ink, an appropriate distribution ratio is different. As a publicly known spatial filter, it may be possible to use a Gaussian filer, a VTF filter corresponding to the perception sensitivity of human eyes, and the like. A graph in FIG. 15 shows a relationship between the distribution ratio and the tone value. In the graph in FIG. 15, the horizontal axis represents the tone value, the vertical axis represents the distribution ratio, and a curve 1501 represents how the distribution ratio changes in accordance with the tone value. In a case where the value of the distribution ratio is, for example, "2.0", the tone value corresponding to the density that is to be in the charge of the non-ejectable nozzle is allocated to the adjacent nozzles adjacent to the non-ejectable nozzle from left and right, respectively. The distribution ratio thus determined is stored in the external storage device 15 as the distribution ratio in the LUT form in which, for example, the input tone value and the distribution ratio are associated with each other. As in the case of the correction table that is used in the density correction processing, it may also be possible to find only the distribution ratios corresponding to representative tone values in place of finding each individual distribution ratio corresponding to all the input tone values between 0 and 255. In that case, for the input tone value that is not specified within the table, it is sufficient to find the corresponding distribution ratio by interpolation processing.

The above is the contents of the processing to determine the distribution ratio of the correction value. In the example shown in FIG. 15, there is one curve representing a relationship between the distribution ratio and the tone value. The reason is that the results of averaging the distribution ratios obtained from each of all the non-ejectable nozzles provided intentionally are taken as the distribution ratio common to all the nozzles. However, this is not limited and for example, it may also be possible to find the distribution ratio by taking all the nozzles as the non-ejectable nozzles intentionally and find the distribution ratio for each nozzle. Alternatively, it may also be possible to group the nozzles according to their features and take the distribution ratio averaged for each group as the distribution ratio information. For example, in a case where the print head includes a combination of a plurality of nozzle rows, it may also be possible to perform grouping fore each nozzle row. Alternatively, it may also be possible to put the nozzles whose nozzle position number is the same among a plurality of nozzle rows into the same group.

Further, in the example described above, the distribution ratio is determined from the scanned image of the output dedicated chart, but this is not limited. For example, a configuration may be accepted in which an operator visually checks the output distribution ratio acquisition chart and selects a distribution ratio with which the influence of a non-ejectable nozzle is the most unlikely to be perceived from among a plurality of alternatives, or an operator directly inputs or sets a distribution ratio expected to be unlikely to be perceived.

<Change of Correction Table>

In a case of the present embodiment, in the change (S1003) of the correction table of the printing processing shown in FIG. 10 described previously, the correction values of the non-ejectable nozzle and the nozzles adjacent thereto are changed as follows. Here, it is assumed that the nozzle whose nozzle position number is n is detected as a non-ejectable nozzle in the non-ejectable nozzle detection processing (S1002). At this time, as the correction values corresponding to the nozzle whose nozzle position number is n, "0" is stored newly for all the input tone values. Further, the correction values I' of the (n+1)th and the (n−1)th nozzles are updated to 1+k×Ix/2. Here, I indicates the correction value before the change, I' indicates the correction value after the change, and Ix indicates the correction value of the non-ejectable nozzle n before the change. Further, k indicates the distribution ratio corresponding to Ix before the change. Alternatively, it may also be possible to use the distribution ratio corresponding to the average tone value of three nozzles before the change (non-ejectable nozzle and adjacent nozzles adjacent thereto from left and right) in place of the distribution ratio corresponding to Ix before the change of the non-ejectable nozzle. That is, in a case where the nth nozzle is not ejectable, it may also be possible to acquire k_ave corresponding to (I (n−1)+I (n)+I (n+1))/3 as the distribution ratio. However, it is assumed that I (x) is the correction value of the xth nozzle before the change. At this time, the correction value I' (n+1) of the (n+1)th nozzle is updated to I (n+1)+k_ave×I (n)/2. For example, it is assumed that the tone value of the non-ejectable nozzle is 36 and the tone values of the adjacent nozzles to the left and right of the non-ejectable nozzle are both 120. In this case, it may also be possible to distribute the tone values to the left and right nozzles by using the distribution ratio k_ave corresponding to (36+120+120)/3=92, which is the average value of the three nozzles, in place of acquiring the distribution ratio k corresponding to 36, which is the tone value of the non-ejectable nozzle. By calculating the distribution ratio by using the average tone value as described above, as in the example described above, it is possible to more appropriately suppress a white streak due to no ejection in a case where there is a difference in the tone value before the change between the non-ejectable nozzle and the adjacent nozzles adjacent thereto from left and right.

By changing the correction values of the adjacent nozzles adjacent to the non-ejectable nozzle from left and right as described above, the density (number of dots or dot size) to be in the charge of the non-ejectable nozzle is distributed to the adjacent nozzles in a ratio in accordance with the tone value of the non-ejectable nozzle. Because of this, even in a case where a white streak is perceived because correction is insufficient or a black streak occurs because correction is too much on a condition that the correction value of the non-ejectable nozzle is simply distributed to the adjacent nozzles, it is possible to appropriately suppress a white spot due to the non-ejectable nozzle.

Further, in the present embodiment, it is possible to independently acquire or update each of the "correction table without the influence of a non-ejectable nozzle", the "correction amount in a case where a non-ejectable nozzle has occurred", and the "nozzle position at which non-ejection correction is performed".

Third Embodiment

In the first and second embodiments, a white streak is suppressed by changing the correction table so that the correction value of a non-ejectable nozzle is allocated to the adjacent nozzles located on both sides of the non-ejectable nozzle. In the third embodiment, the white streak (or change in pattern due to suppression of white streak) is made unlikely to be perceived by changing the correction values of the peripheral nozzles in a wider range, not only the adjacent nozzles on both sides. In the following, explanation of the contents common to those of the preceding first and second embodiments is omitted or simplified and in the following, different points are explained mainly.

Figure 16:
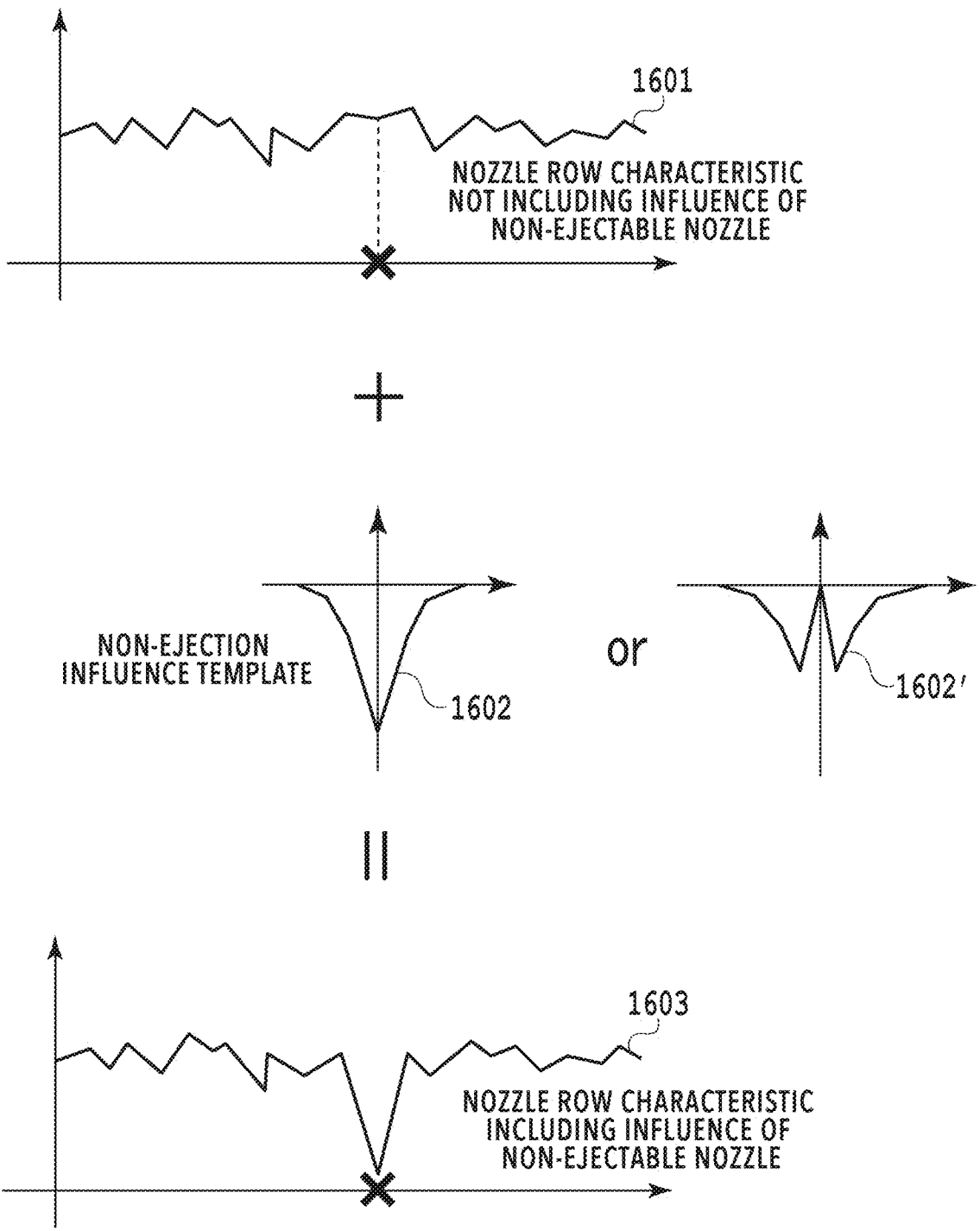
FIG. 16 is a diagram showing a way of thinking in a third embodiment.
Figure 17B:
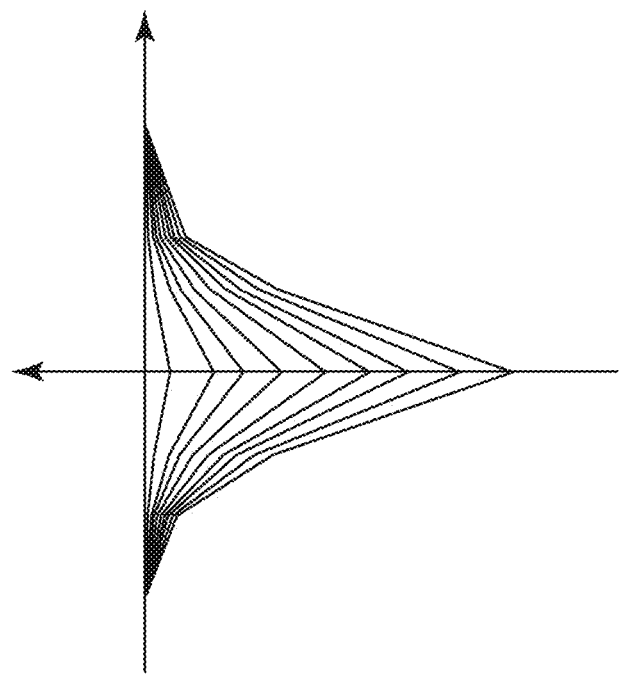
FIG. 17A is a diagram showing an example of a non-ejection influence acquisition chart and FIG. 17B is a diagram showing an example of a characteristic of a non-ejection influence template.
Figure 17A:
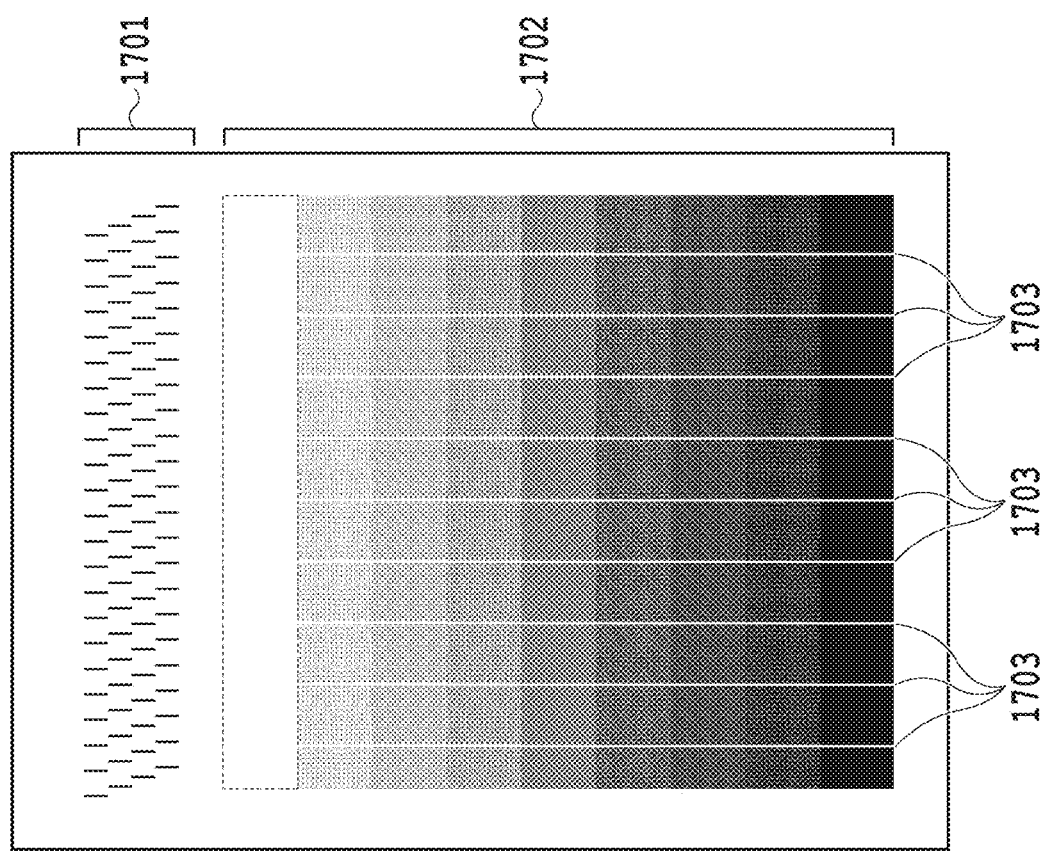

FIG. 16 is a diagram explaining a way of thinking in the present embodiment. In FIG. 16, the horizontal axis of the graph on the top side represents the position of each nozzle in the nozzle row and the vertical axis represents the density (measured value described previously) on the paper surface in a case where the density patch of a predetermined tone is output. In FIG. 16, a line 1601 indicates the density characteristic of the entire nozzle row (in the following, called "nozzle row characteristic"). Here, it is assumed that the nozzle row characteristic 1601 is acquired in accordance with the density correction information generation processing shown by the flowchart in FIG. 6 described previously. Then, here, it is assumed that an ejection failure is detected in the nozzle located at the position indicated by a x mark at the time of acquisition of the nozzle row characteristic 1601. At this time, in the present embodiment, a nozzle row characteristic 1603 in a case where the nozzle at the position indicated by the mark becomes a non-ejectable nozzle, which is shown by a graph on the bottom side in FIG. 16, is generated dynamically by adding a non-ejection influence template indicated by a V-shaped line 1602 on the middle side in FIG. 16 to the nozzle row characteristic 1601. Then, from the nozzle row characteristic generated dynamically, a correction table is created and correction processing is performed by using the correction table. Here, the non-ejection influence template is created from, for example, a non-ejection influence acquisition chart shown in FIG. 17A. The non-ejection influence acquisition chart shown in FIG. 17A also includes a non-ejection detection area 1701 and a density patch area 1702, like the density characteristic acquisition chart shown in FIG. 7 described previously. However, in the density patch area 1702 of the non-ejection influence acquisition chart, at several nozzle positions corresponding to the above-described "intentional non-ejectable nozzles", a portion 1703 in which all the tone values are set to "0" exists. From the scanned image obtained by reading the non-ejection influence acquisition chart after being output from the printing module 107 by the image sensor 108, densities of the nozzles in a range that is affected by the intentional non-ejectable nozzle, for example, densities of five nozzles on the left side and five nozzles on the right side respectively with the non-ejectable nozzle being sandwiched in between are acquired. Further, an average density in portions that are not affected by the non-ejectable nozzle is found. Then, by subtracting the average density from each of the obtained densities of the five nozzles on the left side and the five nozzles on the right side respectively, the non-ejection influence template having the characteristic as shown in FIG. 17B is obtained. In the density patch area 1702 shown in FIG. 17A, the nine kinds of density patch in which the density varies at nine levels exist, and therefore, as shown in FIG. 17B, nine non-ejection influence template having the characteristics shown by nine lines are obtained. In this example, the letter V of the template obtained from the patch whose density is the lowest is the shallowest and the letter V of the template obtained from the patch whose density is the highest is the deepest. Then, it is meant that the shallower the letter V, the smaller the density reduction amount is and the deeper the letter V, the larger the density reduction amount is. FIG. 17B is an example and for example, there is also a case where the letter V becomes shallower as the tone value of the density patch becomes larger with a certain density patch being taken as a boundary. The non-ejection influence template thus obtained is associated with the tone value of each of the original density patches and stored in the external storage device 15.

By performing the correction processing by using the correction table created based on the nozzle row characteristic including the influence of a non-ejectable nozzle as described above, the number of dots (or the dot size) increases by the amount corresponding to the influence in the peripheral nozzles of the non-ejectable nozzle, and therefore, the white streak due to the occurrence of the non-ejectable nozzle is suppressed. In the example in FIG. 17A, the intentional non-ejectable nozzles are provided at predetermined intervals, but it may also be possible to provide them randomly.

<Processing Flow of Entire System>

Next, a flow of entire processing in the image forming system 10 according to the present embodiment is explained with reference to a flowcharts of FIGS. 18A and 18B. As shown in FIGS. 18A and 18B, this processing flow is roughly divided into three pieces of processing, that is, nozzle row characteristic acquisition processing (S1801 to S1806), non-ejection influence template creation processing (S1807 to S1812), and printing processing (S1813 to S1821). In the following, a detailed explanation is given for each piece of processing.

«Nozzle Row Characteristic Acquisition Processing»

The nozzle row characteristic acquisition processing is performed by the density correction information generation unit 305 within the image processing module 106. Each piece of processing at S1801 to S1805 corresponds to that at each of S601 to S605 in the flowchart in FIG. 6 showing the flow of the density correction information generation processing of the first embodiment and there is no difference in particular, and therefore, explanation is omitted. At S1806 in a case where no non-ejectable nozzle is detected, the density characteristic (see the nozzle row characteristic 1601 described previously) of each nozzle row configuring the print head is acquired. That is, at this step, different from the case of S606 of the first embodiment, only the acquisition of the measured curve (see the measured curve 902 described previously) of each nozzle configuring the nozzle row is performed and the creation of the correction table is not performed.

By the processing so far, the nozzle row characteristic not including the influence of a non-ejectable nozzle is acquired. In a case where the acquisition of the nozzle row characteristic is completed, the processing moves to the non-ejection influence template creation processing.

«Non-Ejection Influence Template Creation Processing»

The non-ejection influence template creation processing is performed by a non-ejection influence information generation unit (not shown schematically) within the image processing module 106. Each piece of processing at S1807 to S1811 is similar to that at each of S1801 to S1805 in the above-described nozzle row characteristic acquisition processing. That is, the data of the non-ejection influence acquisition chart image for which halftone processing has been performed is transmitted to the printing module 107 from the density correction information generation unit 305 along with printing instructions thereof and the non-ejection influence acquisition chart is output (S1807). Next, in a case where a scanned image of the output non-ejection influence acquisition chart is acquired by the image sensor 108 (S1808), non-ejectable nozzle detection processing whose target is the non-ejection detection area of the scanned image is performed (S1809). The, in a case where a non-ejectable nozzle is detected (Yes at S1810), cleaning processing is performed (S1811) and in a case where a non-ejectable nozzle is no longer detected, the processing advances to S1812. On a condition that the environment and the conditions are different between the time of non-ejection influence template creation and the time of nozzle row characteristic acquisition, there is a case where it becomes necessary to perform additional processing for absorbing the difference in the application of the created non-ejection influence template. Because of this, it is desirable to perform the output and its reading of the non-ejection influence acquisition chart in the same environment and under the same conditions as those at the time of the output and its reading of the non-ejection influence acquisition chart.

At S1812 in a case where no non-ejectable nozzle is detected, based on the scanned image of the non-ejection influence acquisition chart read at S1808, a non-ejection influence template is created by the method described previously.

By the processing so far, the non-ejection influence template indicating the influence exerted by the non-ejectable nozzle on the density characteristics of the peripheral nozzles thereof is obtained. It is necessary to complete the processing at S1801 to S1082 before the start of the printing processing, to be described later, and for example, the processing at S1801 to S1812 is performed at the time of shipment of the system and at the time of attachment of the print head. Further, it may also be possible to design a configuration in which the nozzle row characteristic and the non-ejection influence template are updated by performing the processing at S1801 to 1812 again at the time of print head exchange, or in accordance with explicit instructions from a user, or each time a predetermined number of sheets is printed or a predetermined time elapses. Furthermore, it may also be possible to evaluate the correction table that is created at S1816, to be described later, each time a predetermined number of sheets is printed or a predetermined time elapses and in a case where it is determined that correction is insufficient, perform the processing at S1801 to S1812 again and perform updating.

«Printing Processing»

Each piece of processing at S1813 and S1814 corresponds to that at S1001 and S1002 respectively in the flowchart in FIG. 10 showing the flow of the printing processing of the first embodiment. That is, the printing preparation processing and the non-ejectable nozzle detection processing are performed. The contents of both pieces of processing are already explained, and therefore, their explanation is omitted.

Next, at S1815, by the correction processing unit 302, processing to apply the non-ejection influence template to the nozzle row characteristic acquired at S1806 is performed based on the nozzle position number of the non-ejectable nozzle detected at S1814. Here, by using a specific example, the template application processing is explained in detail. FIG. 19 is a diagram showing an example of the non-ejection influence template in the table form, which is created at S1812. Each column in the table shown in FIG. 19 indicates a relative positional relationship from the non-ejectable nozzle and each row indicates the tone value of the corresponding density patch. The case of the non-ejection influence template shown in FIG. 19 indicates that, for example, on the density patch whose tone value is "64", the density of the nozzle to the left of the non-ejectable nozzle (nozzle whose relative nozzle position is "−1") is a value that is obtained by subtracting 0.148 from the density in a case where there is no non-ejection. In the non-ejection influence template in FIG. 19, the range that is affected by the non-ejectable nozzle is up to three nozzles on the left and three nozzles on the right of the non-ejectable nozzle respectively. The reason is that the influence that is exerted by the non-ejectable nozzle on the nozzle positions whose relative nozzle position is +4 or more distant or −4 or more distant is 0.001 or less, and therefore, the influence can be determined to be sufficiently ignorable. FIG. 20A is a diagram showing an example of the nozzle row characteristic acquired at S1806 in the table form. In the table shown in FIG. 20A, each column corresponds to the nozzle position number indicating the absolute position of each nozzle and each row corresponds to the tone value of the density patch. In a case of the nozzle row characteristic shown in FIG. 20A, on the density patch whose tone value is "64", the density corresponding to the nozzle whose nozzle position number is "97" is "0.472". Here, it is assumed that the nozzle whose nozzle position number is "97" is detected as a non-ejectable nozzle by the non-ejectable detection processing at S1814. At this time, the nozzle position number "97" is the "relative nozzle position "0"" in the non-ejection influence template in FIG. 19. In this case, to each value stored in the column corresponding to the nozzle position number "97" in the nozzle row characteristic table in FIG. 20A, each value stored in the column corresponding to the "relative nozzle position "0"" in the non-ejection influence template shown in FIG. 19 is added. Due to this, the density in the nozzle in a case where the nozzle whose nozzle position number is "97" becomes a non-ejectable nozzle is found. Similarly, by adding each value stored in the column corresponding to the "relative nozzle position n" in FIG. 19 to each value stored in the column corresponding to the nozzle position number "97+n", the density in the nozzle in a case where the nozzle whose nozzle position number is "97+n" becomes a non-ejectable nozzle is found. In a case where the results of the addition such as this are less than "0", it is sufficient to set the value of the nozzle after the template is applied to "0". FIG. 20B shows the nozzle row characteristic after the non-ejection influence template in FIG. 19 is applied to the nozzle row characteristic in FIG. 20A. For example, in the column whose nozzle position number is "97", as regards the tone value "32", the value "0.228" before the application has changed to the value "0.116" after the application, which is obtained by adding "−0.112" to "0.228". Similarly, as regards the tone value "64", the value "0.472" before the application has changed to the value "0.151" after the application, which is obtained by adding "−0.321" to "0.472". Then, similar changes occur in the adjacent nozzles in the range of −3 to +3 with the nozzle position number "97" being taken as a center (that is, six nozzles whose nozzle position numbers are "94 to 96" and "98 to 100".

At S1816, by the density correction information generation unit 305, a correction table is created based on the nozzle row characteristic after the non-ejection influence template is applied. The specific processing contents are the same as those at S803 and S804 in the flow in FIG. 8 of the first embodiment. That is, first, the target characteristic 903 is acquired and from this, the target density value 905 corresponding to the input tone value 904 is found, and the tone value corresponding to the target density value 905 is determined from the measured curve 902 of the nozzle of interest, and the tone value is taken as the correction value (output tone value) 906 of the nozzle of interest. At this time, for the peripheral nozzle that is affected by the non-ejectable nozzle, the correction value is derived by using the nozzle row characteristic that takes into consideration the influence of the non-ejectable nozzle. For example, in a case where the tone value whose target density value is "0.2" is taken as the correction value, on a condition that the nozzle row characteristic not including the influence of the non-ejectable nozzle shown in FIG. 20A is used, the correction value at the nozzle position number "96" is "27". On the other hand, the use of the nozzle row characteristic after the template in a case where the nozzle whose nozzle position number is "97" is the non-ejectable nozzle is applied will result in that the correction value at the nozzle position number "96" is "35". As described above, for the nozzle that is affected by non-ejection, a large correction value is obtained compared to a case where there is no non-ejection. Then, by the correction value of the nozzle that is affected by non-ejection becoming large, the number of dots ejected in the nozzle increases (or the dot size increases) and as a result of that, the influence of the w % bite streak due to the non-ejectable nozzle is suppressed.

S1817 to S1821 correspond to S1004 to S1008 respectively in the flowchart in FIG. 10 showing the flow of the printing processing of the first embodiment and there is no difference in particular, and therefore, their explanation is omitted.

The above is the flow of the entire processing in the image forming system 10 according to the present embodiment. By the series of printing processing including S1814 to S1816 described above, the white spot that occurs due to a non-ejectable nozzle that has occurred before printing and a non-ejectable nozzle that occurs during printing is suppressed dynamically. Then, even in a case where a non-ejectable nozzle occurs newly or a non-ejectable nozzle recovers during printing, it is not necessary to repeat again the nozzle row characteristic acquisition processing and the non-ejection influence template creation processing, and therefore, this also leads to suppression of the system downtime.

Modification Example

In the above-described example, it is supposed that the detection of a non-ejectable nozzle is performed online in accordance with the number of output sheets also during printing and the non-ejectable nozzle detection processing (S1814) is incorporated in the series of processing configuring the printing processing. However, the non-ejectable nozzle detection timing is not limited to this and for example, the configuration may be one in which the non-ejectable nozzle detection processing is performed between the non-ejection influence template creation processing (S1812) and the printing preparation processing (S1813).

Further, it may also be possible not to perform ink ejection for a non-ejectable nozzle by setting all the correction values to "0" after the correction table is created. Alternatively, it may also be possible to prohibit ink ejection by setting all the threshold values corresponding to the non-ejectable nozzle in the threshold value matrix used in the halftone processing to "255" or more, setting the input tone value thereof to "0", masking the pixel value of the HT image to "0", and so on. By doing so, it is possible to suppress a black streak or the like from occurring in a case where a non-ejectable nozzle recovers unexpectedly during printing.

Further, the non-ejection influence template may be one that is indicated by a W-shaped line like a line 1602' in FIG. 16. In this case, it is possible to obtain the non-ejection influence template by setting the density reduction amount at the non-ejectable nozzle position (relative nozzle position=0) to "0" and changing the density reduction amounts of the peripheral nozzles thereof so that the area indicated by the line 1602 and the area (that is, integral value) indicated by the line 1602' are equal. For example, it may also be possible to distribute the density reduction amount at the non-ejectable nozzle position in accordance with the ratio of the density reduction amount at each of other nozzle positions. Alternatively, it may also be possible to create the non-ejection influence template after applying a publicly known spatial filter to the nozzle row characteristic. Further, in the above-described example, the non-ejection influence template is stored in the table form, but it may also be possible to approximate the influence by the non-ejectable nozzle by a function (for example, Gaussian function) and store the functional formula thereof.

In the above-described example, the nozzle row characteristic and the non-ejection influence template are prepared and stored before the printing processing and the correction table is created based on the nozzle row characteristic after the non-ejection influence template is applied, but this is not limited. For example, the configuration can be one in which a correction table and a non-ejection influence template for the correction table are stored in advance and the non-ejection influence template is added with the detected non-ejectable nozzle being taken as a center. In place of the configuration in which the non-ejection influence template is added, the configuration can also be one in which a nozzle row characteristic that suppresses the influence of non-ejection is stored in advance as a template and in a case where a non-ejectable nozzle occurs, the non-ejection influence template is replaced with the template. However, in the configuration in which the template is replaced with another, the density correction amounts for suppressing the density unevenness, which should be different for each nozzle, are overwritten by the template. In particular, for the nozzle distant from the non-ejectable nozzle, the influence of non-ejection is small and priority should be given to the density unevenness correction, but in a case where overwrite by the template is performed, the effect is no longer obtained. Further, there is a case where another non-ejectable nozzle occurs within the range that is affected by non-ejection. In order to deal with this case by the configuration in which the template is replaced with another, it is necessary to store the template for each positional relationship of a plurality of non-ejectable nozzles. In this regard, with the configuration in which the template is added, it is only required to apply the template to each position at which a non-ejectable nozzle has occurred, and therefore, it can be said that the configuration in which the template is added is superior to the configuration in which the template is replaced with another.

Further, there is a case where a non-ejectable nozzle does not recover even by performing cleaning processing repeatedly. In this case, it may also be possible to create a correction table not including the influence of non-ejection by reversing the signs (plus and minus) of the non-ejection influence template and adding the non-ejection influence template to the nozzle row characteristic.

Fourth Embodiment

In the third embodiment, the density characteristic acquisition chart and the non-ejection influence acquisition chart are separate charts. Further, both charts include the non-ejection detection area and the non-ejection detection processing is performed based on the results of reading of the area (S1803, S1809). Next, an aspect is explained as the fourth embodiment in which the processing up to the acquisition of a nozzle row characteristic and the creation of a non-ejection influence template is performed by using a common chart not including a non-ejection area without performing non-ejection detection processing. In the following, explanation of the contents common to those of the preceding first to third embodiments is omitted or simplified and in the following, different points are explained mainly.

Three charts 2101 to 2103 shown in FIG. 21 are examples of the charts that are used in the present embodiment. Each chart image is created so that the non-ejection detection area 1701 shown in FIG. 17A described previously is not included and the position of the intentional non-ejectable nozzle is different between each chart image. Further, each of three lines 2111 to 2113 in FIG. 21 shows part of a nozzle row characteristic obtained from each scanned image of the three printed and output charts 2101 to 2103 described above. A x mark in FIG. 21 indicates the position corresponding to the intentional non-ejectable nozzle. Here, it is obvious that in a case where a non-ejectable nozzle occurs, the densities of the nozzle and the peripheral nozzles become low (become bright). Consequently, by selecting the highest density characteristic for each nozzle from the plurality of nozzle row characteristics obtained from the output results of the plurality of charts, it is possible to obtain the nozzle row characteristic not including the influence of a non-ejectable nozzle. Alternatively, it is also possible to obtain the nozzle row characteristic not including the influence of a non-ejectable nozzle by averaging a number of densities less than the number of charts in order from the highest density for each nozzle. It may also be possible to determine the number of densities to be averaged based on the probability of non-ejectable nozzle occurrence and for example, it may be possible to take the maximum number of output sheets with which a non-ejectable nozzle is no longer included statistically with a probability of 99% or higher as the number of densities to be averaged. By selecting and calculating the density characteristic for each nozzle from the output results of different charts as described above, it is also possible to exclude the influence of the unintentional non-ejectable nozzle. For example, it is assumed that a non-ejectable nozzle that is not generated intentionally has occurred at the position indicated by a "!" mark of a line 2113' in FIG. 21. In this case also, a nozzle row characteristic not including the influence of a non-ejectable nozzle is obtained by finding the nozzle density characteristic by using one of the line 2111 and the line 2112, or the average value of the curves 1901 and 1902.

Further, it is possible to create the non-ejection influence template by performing the processing described at S1812 described previously to the plurality of the charts 2101 to 2113 as shown in FIG. 21. However, in a case where an unintentional non-ejectable nozzle has occurred within the range that is affected by an intentional non-ejectable nozzle, the non-ejection influence template is created by excluding the intentional non-ejectable nozzle. For example, it is sufficient to exclude the intentional non-ejectable nozzle in a case where another vertex indicated by the x mark exists within the range that is affected by the intentional non-ejectable nozzle as on a line 2111' in FIG. 21.

By the method as described above, it is also possible to obtain the same effect as that of the third embodiment.

Fifth Embodiment

In the first to fourth embodiments, an attempt is made to suppress a white streak that occurs in a case where a non-ejectable nozzle occurs by distributing the density in the charge of the non-ejectable nozzle to the peripheral nozzles. In the fifth embodiment, processing is performed so that the shape of an object within a printing-target image is not impaired, in addition to suppression of a white streak. In the following, explanation of the contents common to those of the preceding first to fourth embodiments is omitted or simplified and in the following, different points are explained mainly.

Figure 22:
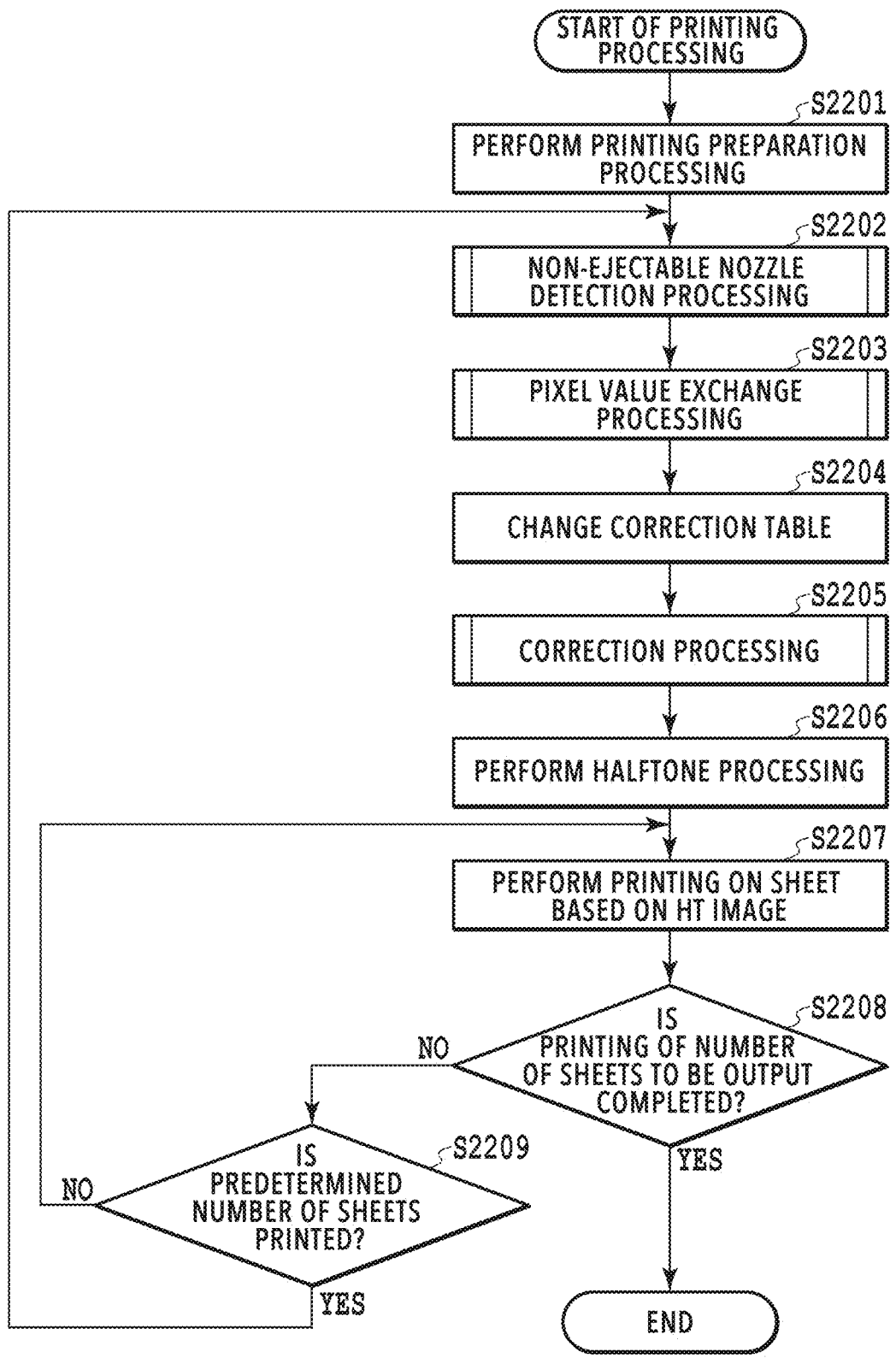
FIG. 22 is a flowchart showing a flow of printing processing according to a fifth embodiment.

FIG. 22 is a flowchart showing a flow of printing processing according to the present embodiment. This flowchart differs from the flowchart in FIG. 10 according to the first embodiment lies in that a step of exchanging pixel values (S2203) is inserted between the step of detecting a non-ejectable nozzle (S2202) and a step of changing the correction table (S2204). That is, S2201 and S2202 in the flowchart in FIG. 22 correspond to S1001 and S1002 described previously and S2204 to S2209 correspond to S1003 to S1008, respectively, and there is no difference in particular. However, in the correction processing at 2205, the printing-target image after the above-described pixel value exchange is performed is the target thereof. In the following, the pixel value exchange processing, which is the feature of the present embodiment, is explained in detail.

<Pixel Value Exchange Processing>

Figure 23:
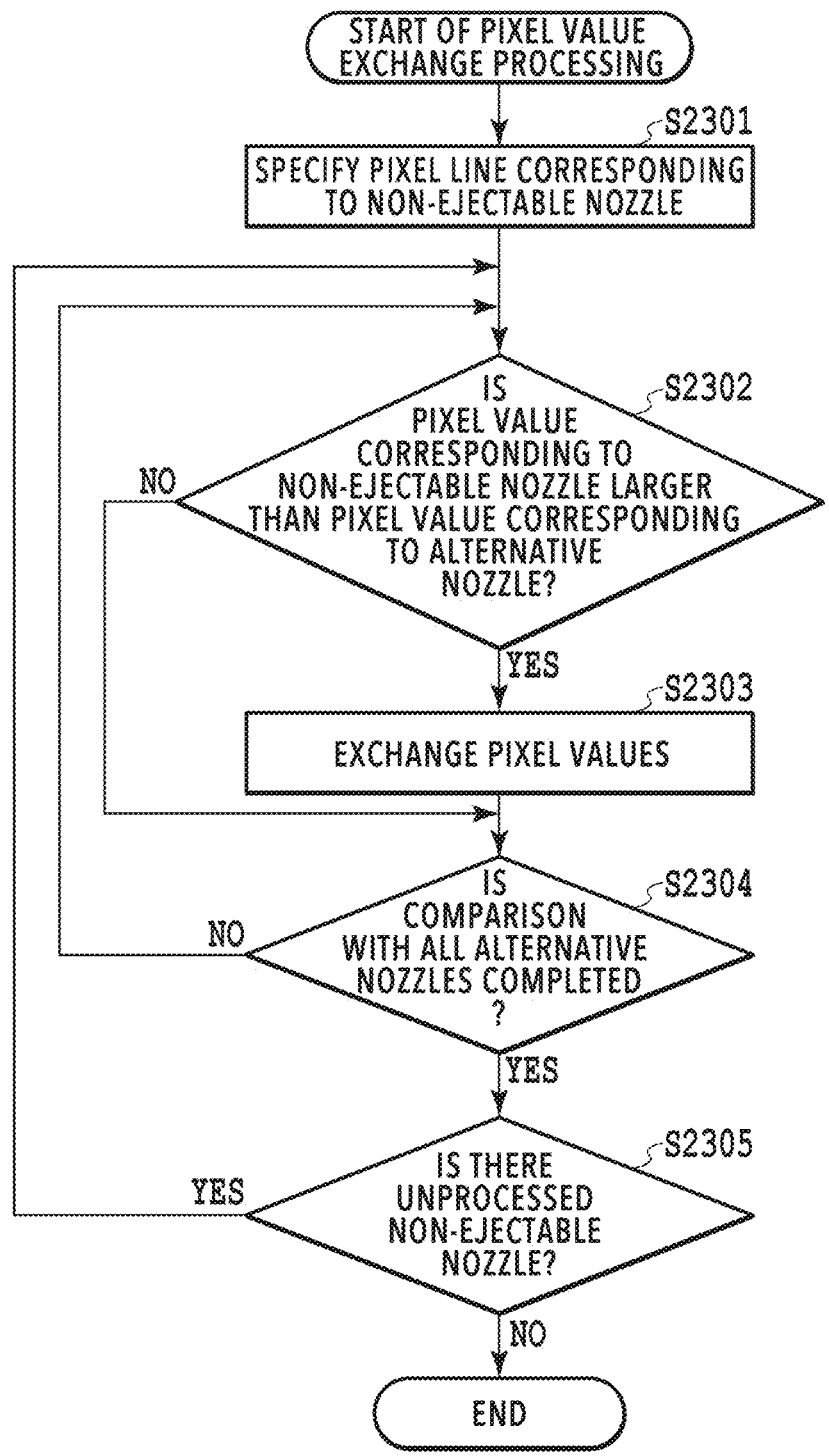
FIG. 23 is a flowchart showing details of pixel value exchange processing.

The pixel value exchange processing is performed by a pixel value exchanging unit (not shown schematically) within the image processing module 106. FIG. 23 is a flowchart showing details of the pixel value exchange processing at S2203. In the following, explanation is given along FIG. 23.

At S2301, based on the non-ejectable nozzle information generated at S2202, the pixel line corresponding to the non-ejectable nozzle of interest among the detected non-ejectable nozzles is specified from each pixel line of the printing-target image.

Next, at S2302, the tone value (pixel value) of the pixel of the pixel line specified at S2301 and the pixel value of the pixel line corresponding to the nozzle adjacent to the non-ejectable nozzle of interest from left or right (in the following, called "alternative nozzle") are compared. At this time, it is preferable to fix the alternative nozzle to the right or left of the non-ejectable nozzle of interest irrespective of the nozzle position number and exchange pixel values preferentially in one direction. In a case where the results of the comparison indicate that the pixel value of the pixel line corresponding to the non-ejectable nozzle of interest is larger, the processing advances to S2303 and the compared pixel values adjacent to each other are exchanged. On the other hand, in a case where the pixel value of the pixel line corresponding to the non-ejectable nozzle of interest is less than or equal to the pixel value of the pixel line of the alternative nozzle, the processing advances to S2304.

At S2304, whether or not the comparison of pixel values and the exchange of pixel values are completed by taking all the alternative nozzles (n) as a target is determined. In a case where there is an unprocessed alternative nozzle, the processing returns to S2302 and the comparison of pixel values and the exchange of pixel values are repeated by updating n and taking the next alternative nozzle as a target. In the repetition processing, the pixel value of the pixel line corresponding to the non-ejectable nozzle of interest, which is compared at S2302, is the pixel value after being exchanged at immediately subsequent S2303. On the other hand, in a case where the comparison of pixel values and the exchange of pixel values are completed by taking all the alternative nozzles (n) as a target, the processing advances to S2305.

At S2305, whether or not the processing at S2302 to S2304 described above are completed by taking all the non-ejectable nozzles included in the non-ejectable nozzle information generated at S2202 as a target is determined. In a case where there is an unprocessed non-ejectable nozzle, the processing returns to S2301, and the next non-ejectable nozzle of interest is determined and the processing at S2302 to S2304 described above is repeated. On the other hand, in a case where the processing is completed for all the non-ejectable nozzles, this flow is terminated.

The above is the contents of the pixel value exchange processing. By this processing, it is possible to prevent an object, such as a thin line, which is to be formed by the non-ejectable nozzle, from being impaired. In a case where the print head is a so-called multi-column head consisting of nozzle rows comprising nozzles performing drawing at the same position in an overlapping manner, it is also possible to apply the present embodiment. In this case, it is sufficient to perform the above-described processing by taking the nozzle that performs drawing at the same position in the nozzle row different from the nozzle row to which the non-ejectable nozzle belongs as the alternative nozzle of the non-ejectable nozzle.

OTHER EMBODIMENTS

In each embodiment, as the nozzle characteristic, the density characteristic is used and the correction table is also created based on density, but for example, it may also be possible to use the characteristic of Y of the CIEXYZ color space or L* of CIELab* for each nozzle and create the correction table also based on the characteristic.

In a case where the scan resolution of the image sensor 108 is different from the resolution of nozzle arrangement of the print head, it is preferable to perform conversion so that the resolution of the scanned image coincides with the resolution of nozzle arrangement. For conversion, it is possible to use a publicly known interpolation method and it is possible to perform enlargement or reduction to the resolution of nozzle arrangement by using, for example, the nearest neighbor method, the bilinear method, the bicubic method and the like.

Further, in each embodiment, the example is explained in which the density correction processing is performed by taking the tone value of the printing-target image as a target, but a configuration may be accepted in which the density correction processing is performed by taking the threshold value of the threshold matrix as a target based on the same way of thinking. With this configuration, it is also possible to obtain the same effect of each embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to implement highly accurate density unevenness correction while suppressing a reduction in productivity of printing accompanying correction value calculation for density unevenness correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-063628 filed Mar. 31, 2020, which is hereby incorporated by reference wherein in its entirety.

What is claimed is:

1. An image processing apparatus for an image forming apparatus that performs printing on a printing medium by using a print head comprising a nozzle row in which a plurality of nozzles ejecting ink is arrayed in one direction, the image processing apparatus comprising:
one or more processors; and
one or more memories that store computer-readable instructions for causing, when executed by the one or more processors, the image processing apparatus to function as:
a detection unit configured to detect a non-ejectable nozzle that cannot eject ink normally among nozzles configuring the nozzle row;
an acquisition unit configured to acquire a nozzle row characteristic indicating a characteristic of each nozzle based on a scanned image of a first chart including a plurality of patches, which is output from the image forming apparatus;
a creation unit configured to create a template indicating influence exerted by the non-ejectable nozzle based on a scanned image of a second chart including a plurality of patches, which is output from the image forming apparatus; and
a generation unit configured to generate density correction information for reducing density unevenness in the printing, wherein
the first chart and the second chart include a plurality of patches having different tones and extending in a direction of the nozzle row,
each patch of the second chart includes at least a portion in which a dot is not formed at a position corresponding to a specific nozzle in the nozzle row,
the generation unit:
acquires the nozzle row characteristic including the influence of the non-ejectable nozzle by applying the template in accordance with a position of the non-ejectable nozzle detected by the detection unit to the nozzle row characteristic acquired by the acquisition unit; and
generates density correction information that specifies an output tone value for implementing a target density for an input tone value for each nozzle based on the acquired nozzle row characteristic including the influence of the non-ejectable nozzle the second chart further includes a pattern for detecting the non-ejectable nozzle,
the detection unit detects the non-ejectable nozzle by analyzing the pattern in the scanned image of the second chart that is output from the image forming apparatus, and
the creation unit creates the template based on the non-ejectable nozzle detected by the detection unit.

2. The image processing apparatus according to claim 1, wherein
the generation unit:
acquires the nozzle row characteristic including the influence of the non-ejectable nozzle detected by the detection unit by adding the template to the nozzle row characteristic acquired by the acquisition unit; and
generates the density correction information from the acquired nozzle row characteristic.

3. The image processing apparatus according to claim 2, wherein
the characteristic of each nozzle specified by the nozzle row characteristic is a density characteristic,
in the template, a relative nozzle position for the non-ejectable nozzle and a density reduction amount are associated with each other, and
the generation unit:
finds a nozzle row characteristic whose density is reduced by the associated density reduction amount based on a relative positional relationship with the nozzle detected as a non-ejectable nozzle by the detection unit for each nozzle whose density characteristic is specified by the nozzle row characteristic acquired by the acquisition unit; and generates the density correction information from the found nozzle row characteristic.

4. An image processing apparatus for an image forming apparatus that performs printing on a printing medium by using a print head comprising a nozzle row in which a plurality of nozzles ejecting ink is arrayed in one direction, the image processing apparatus comprising:

one or more processors; and one or more memories that store computer-readable instructions for causing, when executed by the one or more processors, the image processing apparatus to function as:

a detection unit configured to detect a non-ejectable nozzle that cannot eject ink normally among nozzles configuring the nozzle row;

a creation unit configured to create a nozzle row characteristic indicating a characteristic of each nozzle and a template indicating influence exerted by the non-ejectable nozzle based on scanned images of a plurality of charts output from the image forming apparatus; and a generation unit configured to generate density correction information for reducing density unevenness in the printing, wherein each of the plurality of charts includes a plurality of patches having different tones and extending in a direction of the nozzle row, each patch includes at least a portion in which a dot is not formed at a position corresponding to a specific nozzle in the nozzle row, the portion in which a dot is not formed is different for each of the plurality of charts, the generation unit:

acquires a nozzle row characteristic indicating a characteristic of each nozzle from each scanned image of the plurality of charts;

generates a nozzle row characteristic not including influence of a non-ejectable nozzle by selecting a highest density characteristic for each nozzle from a plurality of acquired nozzle row characteristics, or averaging a predetermined number of densities in order from the highest density for each nozzle;

acquires the nozzle row characteristic including the influence of the non-ejectable nozzle by applying the template in accordance with a position of the non-ejectable nozzle detected by the detection unit to the generated nozzle row characteristic not including the influence of the non-ejectable nozzle; and generates density correction information that specifies an output tone value for implementing a target density for an input tone value for each nozzle based on the acquired nozzle row characteristic including the influence of the non-ejectable nozzle.

* * * * *